(12) United States Patent
Papillon et al.

(10) Patent No.: US 11,067,204 B2
(45) Date of Patent: Jul. 20, 2021

(54) POLYMER COMPOSITIONS

(71) Applicant: ImerTech SAS, Paris (FR)

(72) Inventors: Jean-Benoit Papillon, Par Cornwall (GB); John Slater, St Austell Cornwall (GB); Fatima Rebih, Toulouse (FR)

(73) Assignee: ImerTech SAS, Paris (FR)

( * ) Notice: Subject to any disclaimer, the term of this patent is extended or adjusted under 35 U.S.C. 154(b) by 16 days.

(21) Appl. No.: 15/509,770

(22) PCT Filed: Sep. 9, 2015

(86) PCT No.: PCT/EP2015/070649
§ 371 (c)(1),
(2) Date: Mar. 8, 2017

(87) PCT Pub. No.: WO2016/038110
PCT Pub. Date: Mar. 17, 2016

(65) Prior Publication Data
US 2017/0261131 A1 Sep. 14, 2017

Related U.S. Application Data

(63) Continuation of application No. PCT/EP2015/070649, filed on Sep. 5, 2015.

(30) Foreign Application Priority Data

Sep. 9, 2014 (EP) .................................... 14290268
Oct. 8, 2014 (EP) .................................... 14188156
May 1, 2015 (EP) .................................... 15290124

(51) Int. Cl.
*F16L 9/12* (2006.01)
*F16L 9/18* (2006.01)
(Continued)

(52) U.S. Cl.
CPC .................. *F16L 9/12* (2013.01); *C08K 3/26* (2013.01); *C08K 9/04* (2013.01); *C08L 23/04* (2013.01);
(Continued)

(58) Field of Classification Search
CPC .. C08L 23/06; C08L 2203/18; C08L 2205/02; C08L 2207/062; C08L 2207/20;
(Continued)

(56) References Cited

U.S. PATENT DOCUMENTS 3,888,912 A  6/1975 Burguette
4,267,365 A  5/1981 Findeisen
(Continued)

FOREIGN PATENT DOCUMENTS

CN  102 911 429 A  2/2013
CN  103748151 A  4/2014
(Continued)

OTHER PUBLICATIONS

International Search Report and Written Opinion dated Mar. 9, 2016, in International PCT Application No. PCT/EP2015/070649, filed Sep. 9, 2015.
(Continued)

*Primary Examiner* — Yan Lan
(74) *Attorney, Agent, or Firm* — Finnegan, Henderson, Farabow, Garrett & Dunner, LLP

(57) ABSTRACT

Polymer compositions comprising at least two polyethylene polymers, for example, recycled polymer compositions, methods for the production thereof, the use of functional fillers in said compositions, and articles formed from the polymer compositions. Pipe having at least one wall, the pipe having a nominal inside diameter of at least about 400 mm and a SN of at least about 4, and wherein the at least one wall comprises at least about 25% by weight of recycled polymer, based on the total weight of the at least one wall.

22 Claims, 1 Drawing Sheet

(51) Int. Cl.
*F16L 11/15* (2006.01)
*C08L 23/06* (2006.01)
*C08L 23/04* (2006.01)
*C08L 23/10* (2006.01)
*C08K 3/26* (2006.01)
*C08K 9/04* (2006.01)

(52) U.S. Cl.
CPC ............... *C08L 23/06* (2013.01); *C08L 23/10* (2013.01); *F16L 9/18* (2013.01); *F16L 11/15* (2013.01); *C08L 2203/18* (2013.01); *C08L 2205/02* (2013.01); *C08L 2205/025* (2013.01); *C08L 2205/03* (2013.01); *C08L 2205/06* (2013.01); *C08L 2207/062* (2013.01); *C08L 2207/20* (2013.01)

(58) Field of Classification Search
CPC ........... C08L 2205/025; C08L 2205/06; C08L 23/10; C08L 23/12; C08K 9/04; C08K 3/26; F16L 9/12; F16L 11/15; F16L 9/18; C08F 10/02; C08F 2500/12
See application file for complete search history.

(56) References Cited

U.S. PATENT DOCUMENTS

| | | |
|---|---|---|
| 6,348,536 B1 | 2/2002 | Fourty et al. |
| 7,732,514 B2 | 6/2010 | Rothon et al. |
| 8,642,683 B1 | 2/2014 | Dellock et al. |
| 8,894,322 B2 | 11/2014 | Yildirim |
| 8,895,123 B2 | 11/2014 | Ek et al. |
| 2004/0170790 A1 | 9/2004 | Ek et al. |
| 2005/0089371 A1 | 4/2005 | Gallant |
| 2005/0261435 A1* | 11/2005 | Starita ............... C08L 23/06 525/240 |
| 2009/0075004 A1 | 3/2009 | Starita |
| 2018/0298169 A1 | 10/2018 | Slater |

FOREIGN PATENT DOCUMENTS

| | | |
|---|---|---|
| EP | 0 533 154 A1 | 3/1993 |
| EP | 0 614 948 A1 | 9/1994 |
| EP | 0 820 566 B1 | 9/2000 |
| EP | 1 199 408 A1 | 4/2002 |
| EP | 1 260 546 A1 | 11/2002 |
| EP | 2 537 883 A1 | 12/2012 |
| GB | 1 409 508 | 10/1975 |
| JP | 1974-077947 A | 7/1974 |
| JP | 1976-000547 A | 1/1976 |
| WO | WO 00/52094 * | 9/2000 |
| WO | WO 02/053646 A1 | 7/2002 |
| WO | WO 2012/175504 A1 | 12/2012 |

OTHER PUBLICATIONS

Zhu et al., "A Handbook of Industrial Assistants," pp. 477-479, 486, 487, 490, 491 (2007).
Dow Engage™ Polyolefin Elastomers: Product Selection Guide, The Dow Chemical Company, (2014).
Search Report for related Chinese Application No. 201580048260.9, dated Jan. 29, 2019.
Shoup, "Injection Molding Fractional Melt Index, High Density Polyethylene Materials," Chevron Phillips Chemical Co. LP, SPE International Polyolefins Conference, (2005).
"Paper Coating Pigments", Tappi Monograph Series No. 30, Hagemeyer and Brooks, pp. 34-35, (1966).
VolkerWessels, "Questions and Answers—PlasticRoad," (2007).

* cited by examiner

POLYMER COMPOSITIONS

CLAIM FOR PRIORITY

This application is a U.S. national phase entry under 35 U.S.C. § 371 from PCT International Application No. PCT/EP2015/070649, filed Sep. 9, 2015, which claims the benefit of priority of EP Application No. 14290268.3, filed Sep. 9, 2014, EP Application No. 14188156.5, filed Oct. 8, 2014, and EP Application No. 15290124.5, filed May 1, 2015, all of which are incorporated herein by reference.

TECHNICAL FIELD

The present invention is directed to polymer compositions comprising at least two polyethylene polymers, for example, recycled polymer compositions, to methods for the production thereof, to the use of functional fillers in said compositions, and to articles formed from the polymer compositions. The present invention is further directed to a pipe having at least one wall, the pipe having a nominal inside diameter of at least 400 mm and a SN of at least about 4, wherein the at least one wall comprises at least about 25% by weight recycled polymer, and to compounded polymer resin compositions suitable for use in such pipes.

BACKGROUND OF THE INVENTION

It is known to incorporate inorganic particulate fillers, such as ground inorganic minerals into polymer compositions for a variety of purposes. Approaches have been proposed to improve the compatibility of the inorganic filler and the polymer composition. For example, U.S. Pat. No. 7,732,514 describes a composition comprising a plastics material, an inorganic particulate solid such as aluminium hydrate and a coupling surface modifier. In coupling surface modifiers the modifier interacts with both the surface of the particulate filler and the polymer matrix.

In recent years, the recycling of polymer waste material has come to the fore. However, the recycling of polymer waste material has presented challenges which are not necessarily encountered during the preparation of polymer compositions derived from virgin polymer.

As the need to recycle polymer waste materials increases, there is a continuing need for the development of new methods and compositions for the economically viable processing of polymer waste materials into high quality polymer compositions and articles.

High density polyethylene (HDPE) and polypropylene PP are used in the production of pipes, for example, corrugated pipes for use in applications such as drainage and sewage. Virgin polypropylene is typically used to make PP pipes, due to the rather limited availability of high purity recycled polypropylene on the markets.

Generally, as the diameter of a pipe made from a polymer increases, there is a tendency for the stiffness (i.e., deformation under load) of the pipe to decline. This may be exacerbated when recycled polymers and/or filled polymers are used. Pipe stiffness may be characterized in terms of a Stiffness Number (SN) according to EN ISO 9969. SNs range from 1 to 16, with 16 being the stiffest. Virgin PP is favoured when making large diameter pipes, for example, pipes having a nominal inside diameter of at least about 400 mm, because large diameter pipes made from virgin polypropylene are found to exhibit better mechanical properties (e.g., a higher SN). However, virgin polypropylene is costly and it is becoming increasingly environmentally desirable to utilise recycled polymers.

SUMMARY OF THE INVENTION

According to a first aspect, the present invention is directed to a polymer composition comprising:
  at least two polyethylene polymers, and
  a functional filler comprising inorganic particulate and a surface treatment agent on a surface of the inorganic particulate;
  wherein the at least two polyethylene polymers are coupled, and
  wherein a first of the at least two polyethylene polymers comprises HDPE.

According to a second aspect, the present invention is directed to a masterbatch from which a polymer composition according to the first aspect may be formed.

According to a third aspect, the present invention is directed to a method of making an article of manufacture, said method comprising forming the article of manufacture from a polymer composition according to the first aspect.

According to a fourth aspect, the present invention is directed to a method of mitigating blending of polymer components during the manufacture of an article of manufacture, said method comprising (i) providing a pre-formed polymer composition comprising at least two types of HDPE and a functional filler comprising inorganic particulate having a surface treatment agent on a surface of the inorganic particulate, and (ii) forming an article of manufacture therefrom.

According to a fifth aspect, the present invention is directed to a method of mitigating blending of polymer components at a plant for the manufacture of an article of manufacture, said method comprising (i) providing, at the plant, a pre-formed polymer composition comprising at least two types of HDPE and a functional filler comprising inorganic particulate having a surface treatment agent on a surface of the inorganic particulate, and (ii) forming an article of manufacture therefrom at the plant.

According to a sixth aspect, the present invention is directed to a method of making at least two different types of article of manufacture from the same starting material, said method comprising (i) providing a starting material which is a polymer composition comprising at least two types of HDPE and a filler comprising inorganic particulate having a coating on the surface of the inorganic particulate, (ii) forming a first type of article of manufacture from the starting material, and (iii) forming at least a second type of article of manufacture from the starting material.

According to a seventh aspect, the present invention is directed to an article of manufacture formed from a polymer composition according to the first aspect.

According to an eight aspect, the present invention is directed to the use of a functional filler comprising inorganic particulate and a surface treatment agent on a surface of the inorganic particulate in a polymer composition comprising at least two polyethylene polymers, wherein the at least two polyethylene polymers are coupled to the functional filler, and wherein a first of the at least two polyethylene polymers comprises HDPE.

According to a ninth aspect, the present invention is directed to the use of a polymer composition according to the first aspect for improving a mechanical property of an article of manufacture formed therefrom.

According to a tenth aspect, the present invention is directed to a method of increasing the diameter of pipes while maintaining or improving the stiffness of the pipes, said method comprising forming the pipes from a polymer composition according to the first aspect.

According to an eleventh aspect, the present invention is directed to a method of making a polymer composition according to the first aspect, comprising compounding the at least two polyethylene polymers with the functional filler.

According to a twelfth aspect, the present invention is directed to a pipe having at least one wall, the pipe having a nominal inside diameter of at least about 400 mm and a SN of at least about 4, and wherein the at least one wall comprises at least about 25% by weight of recycled polymer, based on the total weight of the at least one wall.

According to a thirteenth aspect, the present invention is directed to the use of recycled polymer which is coupled and as defined in accordance with the twelfth aspect to at least partially replace, optionally wholly replace, virgin polymer, for example, virgin polypropylene, in a pipe having a nominal inside diameter of at least about 400 mm and a SN of at least about 4.

According to a fourteenth aspect, the present invention is directed to the use of recycled polymer which is coupled and as defined in accordance with the twelfth aspect to at least partially replace, optionally wholly replace, recycled polymer which is not coupled, for example, uncoupled recycled HDPE derived from post-consumer polymer waste, e.g., blow moulded bottles, in a pipe having a nominal inside diameter of at least about 400 mm and a SN of at least about 4.

DETAILED DESCRIPTION OF THE INVENTION

Figure 1:
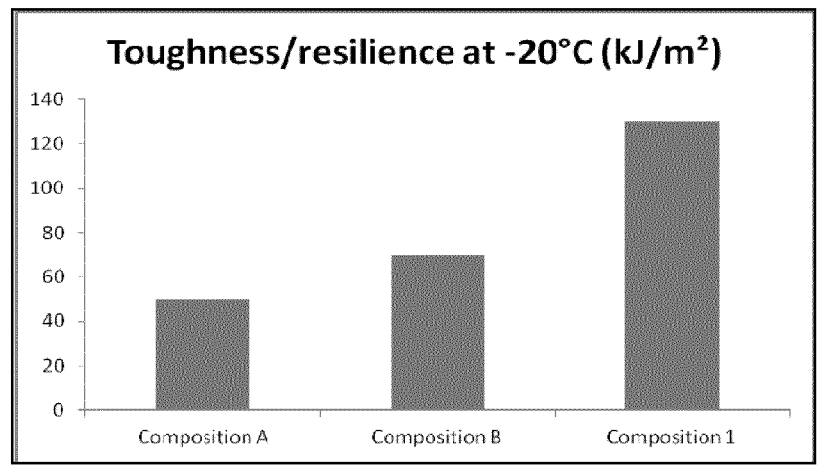
FIG. 1 is a graph summarizing the toughness/resilience of test pieces prepared according to the Examples.

Polymer Compositions Comprising at Least Two Polyethylene Polymers

As described above, the present invention is directed to a polymer composition comprising at least two polyethylene polymers, and a functional filler comprising inorganic particulate and a surface treatment agent on a surface of the inorganic particulate. The at least two polyethylene polymers are coupled, and a first of the at least two polyethylene polymers comprises HDPE (high density polyethylene). Without wishing to be bound by theory, it is believed that the at least two polyethylene polymers are coupled to the inorganic particulate via the surface treatment agent which, as described below, functions as a coupling modifier. The terms "first" and "second" used in connection with the at least two polyethylene polymers are used merely to distinguish between each of the at least two polyethylene polymers.

Generally, HDPE is understood to be a polyethylene polymer mainly of linear, or unbranched, chains with relatively high crystallinity and melting point, and a density of about 0.96 g/cm$^3$ or more. Generally, LDPE (low density polyethylene) is understood to be a highly branched polyethylene with relatively low crystallinity and melting point, and a density of from about 0.91 g/cm$^3$ to about 0.94 g/cm. Generally, LLDPE (linear low density polyethylene) is understood to be a polyethylene with significant numbers of short branches, commonly made by copolymerization of ethylene with longer-chain olefins. LLDPE differs structurally from conventional LDPE because of the absence of long chain branching.

In certain embodiments, the polyethylene polymers are recycled polymers. In certain embodiments, at least the first of the polyethylene polymers is a recycled polymer. In certain embodiments, the recycled polyethylene polymers are derived from polymer waste, for example, post-consumer polymer waste, post-industrial polymer waste, and/or post-agricultural waste polymer. In certain embodiments, the polyethylene polymers are recycled post-consumer polymer waste.

At least the first of the polyethylene polymers comprises HDPE. In certain embodiments, the first of the polyethylene polymer comprises at least about 80% by weight HDPE, based on the total weight of the first polyethylene polymer, for example, at least about 85% HDPE, or at least about 90% HDPE, or at least about 95% HDPE. In certain embodiments, the first polyethylene polymer consists of, or consists essentially of, HDPE. In certain embodiments, the polyethylene polymer comprises less than 1% by weight of species other than HDPE, for example, less than about 0.5% by weight of species other than HDPE. In certain embodiments, the first polyethylene polymer comprises less than about 10% by weight polypropylene, for example, less than about 5% by weight polypropylene, or less than about 1% by weight polypropylene.

In certain embodiments, the first of the at least two polyethylene polymers has an MFR (melt flow rate) of less than 0.75 g/10 mins @ 190° C./2.16 kg, for example, an MFR of equal to or less than about 0.72 g/10 mins, or equal to or less than about 0.70 g/10 mins.

In certain embodiments, the first of the at least two polyethylene polymers has an MFR of from about 0.10 to about 0.74 g/10 mins @ 190° C./2.16 kg, for example, from about 0.20 to about 0.70 g/10 mins, or from about 0.30 to about 0.60 g/10 mins, or from about 0.40 to about 0.50 g/10 mins, or from about 0.50 to about 0.74 g/10 mins, or from about 0.50 to about 0.70 g/10 mins, or from about 0.60 to about 0.74 g/10 mins, or from about 0.60 to about 0.70 g/10 mins. In certain embodiments, the first of the at least two polyethylene polymers has an MFR of at least about 0.02 g/10 min @ 190° C./2.16 kg. In certain embodiments, the first of at least two polyethylene polymers has an MFR of from about 0.30 to about 0.50 g/10 mins @ 190° C./2.16 kg. In certain embodiments, the first of at least two polyethylene polymers has an MFR of from about 0.35 to about 0.45 g/10 mins @ 190° C./2.16 kg.

MFR may be determined in accordance with ISO1133.

In certain embodiments, the first polyethylene polymer is derived from blow-moulded polyethylene, i.e., the HDPE is blow-moulded HDPE, such as that contained or comprised in polyethylene bottles. Thus, in certain embodiments, the HDPE of the first polyethylene polymer is recycled blow-moulded polyethylene.

In certain embodiments, the second of the at least two polyethylene polymers comprises HDPE. The HDPE of the second polyethylene polymer is different than the HDPE of the first polyethylene polymer, for example, it may have shorter chain length and/or lower viscosity than the HDPE of the first polyethylene polymer. In certain embodiments, the second of the polyethylene polymer comprises at least about 50% by weight HDPE, based on the total weight of the second polyethylene polymer, for example, at least about 60% HDPE, or at least about 70% HDPE, or at least about 80% HDPE, or at least about 85% HDPE. In certain embodiments, the second polyethylene polymer comprises less than about 90% HDPE. In certain embodiments, the second polyethylene polymer comprises equal to or greater than about 10% by weight polypropylene, for example, from about 10% to about 30% by weight polypropylene, or from about 10% to about 20% polypropylene.

In certain embodiments, the second of the at least two polyethylene polymers has an MFR of equal to or greater than 0.75 g/10 mins @ 190° C./2.16 kg, for example, an MFR of at least about 0.77 g/10 mins, or at least 0.80 g/10 mins. In certain embodiments, the second of the at least two polyethylene polymers has an MFR of from about 0.75 to about 15 g/10 mins @ 190° C./2.16 kg, for example, from about 0.80 to about 10 g/10 mins, or from about 0.90 to about 8 g/10 min, or from about 0.90 to about 6 g/10 min, or from about 1.0 to about 4 g/10 min, or from about 1.0 to about 2.0 g/10 min. In certain embodiments, the second of the at least polyethylene polymers has an MFR of no greater than about 20 g/10 mins @ 190° C./2.16 kg. In certain embodiments, the second of the at least two polyethylene polymers has an MFR of from about 1.0 to about 2.0 g/10 min @ 190° C./2.16 kg. In certain embodiments, the second of the at least two polyethylene polymers has an MFR of from about 1.25 to about 1.75 g/10 min @ 190° C./2.16 kg.

In certain embodiments, the second polyethylene polymer is derived from injection-moulded polyethylene, i.e., the HDPE is injection-moulded HDPE. Thus, in certain embodiments, the HDPE of the second polyethylene polymer is recycled injection-moulded polyethylene.

In certain embodiments, the first of the at least two polyethylene polymers has an MFR of from about 0.30 to about 0.50 g/10 mins @ 190° C./2.16 kg, and the second of the at least two polyethylene polymers has an MFR of from about 1.0 to about 2.0 g/10 min @ 190° C./2.16 kg.

In certain embodiments, the total amount of HDPE present in the polymer composition is from about 50% by weight to about 90% by weight of the polymer composition, for example, from about 55% to about 85% by weight, or from about 60% to about 85% by weight, or from about 65% to about 85% by weight, or from about 70% to about 85% by weight, or from about 70% to about 80% by weight, or from about 75% to about 80% by weight of the polymer composition.

In certain embodiments, the weight ratio of the HDPE of the first polyethylene polymer to the HDPE of the second polyethylene polymer is from about 0.5:1 to about 3:1, for example, from about 1:1 to about 3:1, or from about 1:1 to about 2:1, or from about 1:1 to about 3:2.

In certain embodiments, the polymer composition comprises from about 10% to about 75% by weight of HDPE of the first polyethylene polymer, based on the total weight of the polymer composition, for example, from about 20% to about 65% by weight, or from about 30% to about 65% by weight of HDPE of the first polyethylene polymer, and optionally from about 20% to about 45% of the HDPE of the second polyethylene polymer. In certain embodiments, the polymer composition comprises from about 35% to about 55% by weight of the HDPE of the first polyethylene polymer and from about 25% to about 40% by weight of the HDPE of the first polymer. In certain embodiments, the polymer composition comprises from about 40% to about 50% by weight of the HDPE of the first polyethylene polymer and from about 25 to about 35% by weight of the HDPE of the second polyethylene polymer. In certain embodiments, the polymer composition comprises from about 42 to about 47% of the HDPE of the first polyethylene polymer and from about 28 to about 34% by weight of HDPE of the second polyethylene polymer.

In certain embodiments, the relative amounts of HDPE are subject to the proviso that the total amount of HDPE in the polymer composition is from about 50% to about 90% by weight of the polymer composition.

The polymer composition may comprise polymers other than at least two polyethylene polymers. The polymer composition may comprise polyethylene polymers which are not coupled.

In certain embodiments, the polymer composition comprises up to about 20% of polymers other than HDPE such as, for example, LDPE, LLDPE and polypropylene, any or all of which may be recycled from polymer waste, e.g., post-consumer polymer waste. In certain embodiments, the polymer composition comprises up to about 20% by weight polypropylene, based on the total weight of the polymer composition, for example, from about 1% to about 20% by weight, or from about 5% to about 18% by weight, or from about 10% to about 15% by weight, or from about 12 to about 14% by weight. In certain embodiments, at least a portion of the polypropylene is derived from the second polyethylene polymer, and optionally from the first polyethylene polymer.

In certain embodiments, the polymer composition may comprise virgin polymer.

The functional filler may be present in the polymer composition in an amount ranging from about 1% up to about 70% by weight, based on the total weight of the polymer composition. For example, from about 2% to about 60% by weight, or from about 3% to about 50% by weight, or from about 4% to about 40% by weight, or from about 5% to about 30% by weight, or from about 6% to about 25% by weight, or from about 7% to about 20% by weight, or from about 8% to about 15% by weight, or from about 8% to about 12% by weight, based on the total weight of the polymer composition. The functional filler may be present in amount less than or equal to about 80% by weight of the polymer composition, for example, less than or equal to about 70% by weight, or less than or equal to about 60% by weight, or less than or equal to about 50% by weight, or less than or equal to about 40% by weight, or less than or equal to about 30% by weight, or less than or equal to about 20% by weight, or less than or equal to about 50% by weight, based on the total weight of the polymer composition.

The surface treatment agent (i.e., coupling modifier) of the functional filler, preferably the compound of formula (1) as described below, may be present in the polymer compositions in an amount of from about 0.01% by weight to about 4% by weight, based on the total weight of the polymer composition, for example, from about 0.02% by weight to about 3.5% by weight, or from about 0.05% by weight to about 1.4% by weight, or from about 0.1% by weight to about 0.7% by weight, or from about 0.15% by weight to about 0.7% by weight, or from about 0.3% by weight to about 0.7% by weight, or from about 0.5% by weight to about 0.7% by weight, or from about 0.02% by weight to about 0.5%, or from about 0.05% by weight to about 0.5% by weight, or from about 0.1% by weight to about 0.5% by weight, or from about 0.15% by weight to about 0.5% by weight, or from about 0.2% by weight to about 0.5% by weight, or from about 0.3% by weight to about 0.5% by weight, based on the total weight of the polymer composition.

The polymer composition, and/or an article formed therefrom, may be characterized by advantageous mechanical properties, including, for example, resilience (also referred to as toughness), elongation at break, flexural modulus (also referred to as stiffness) and deflection (also referred to as ductility).

In certain embodiments, the polymer composition has:

(i) a resilience of greater than 60 kJ/m$^2$ @ −20° C., for example, greater than 70 kJ/m$^2$ @ −20° C.; and/or (ii) an elongation at break of greater than 32%, for example, greater than 65%; and/or (iii) a flexural modulus greater than 800 MPa, for example, greater than 900 MPa, or greater than 980 MPa; and or (iv) a total deflection @ −20° C. of at least about 10.0 mm, for example, of at least about 15.0 mm.

In certain embodiments, the polymer composition, and/or an article formed therefrom, has a resilience @ −20° C. of from about 80 kJ/m$^2$ to about 400 kJ/m$^2$, for example, from about 100 to about 300 kJ/m$^2$, or from about 100 to about 200 kJ/m$^2$, or from about 110 to about 180 kJ/m$^2$, or from about 110 to about 170 kJ/m$^2$, or from about 120 to about 160 kJ/m$^2$, or from about 130 to about 150 kJ/m$^2$, or from about 130 to about 140 kJ/m$^2$, or from about 140 to about 170 kJ/m$^2$, or from about 150 to about 160 kJ/m$^2$. Resilience/toughness @ −20° C. may be determined in accordance with ISO179.

In certain embodiments, the polymer composition, and/or an article formed therefrom, has an elongation at break from about 40% to about 500%, for example, from about 60% to about 400%, or from about 80% to about 300%, or from about 80% to about 200%, or from about 80% to about 150%, or from about 80% to about 125%, or from about 90% to about 120%, or from about 90% to about 115%, or from about 90% to about 110%, or from about 95% to about 110%, or from about 100% to about 105%. Elongation at break may be determined in accordance with ISO178.

In certain embodiments, the polymer composition, and/or an article formed therefrom, has a flexural modulus of from 900 MPa to about 2000 MPa, for example, from about 900 to about 1750 MPa, or from about 900 to about 1500 MPa, or from about 950 to about 1250 MPa, or from about 950 MPa to about 1200 MPa, or from about 950 MPa to about 1150 MPa, or from about 950 MPa to about 1100 MPa, or from about 1000 MPa to about 1100 MPa, or from about 1025 MPa to about 1075 MPa Flexural modulus/stiffness may be determined in accordance with ISO178.

In certain embodiments, the polymer composition, and/or an article formed therefrom, has a total deflection @ −20° C. of from about 10.0 mm to about 30.0 mm, for example, from about 12.0 mm to about 30.0 mm, or from about 15.0 mm to about 30.0 mm, or from about 17.5 mm to about 27.5 mm, or from about 20.0 mm to about 25.0 mm.

As such, the polymer composition may used to modify, for example, enhance or improve, a mechanical property of an article of manufacture, by forming the article of manufacture from the polymer composition. The mechanical property may be selected from one or more of resilience (toughness), elongation at break, flexural modulus (stiffness) and deflection (ductility). In this regard, it has unexpectedly been found that synergistic improvements in mechanical properties, such as resilience and deflection, may be obtained by having at least two different polyethylene polymers coupled, and at the same time maintaining other mechanical properties such as stiffness. Further evidence of this surprising synergist effect is provided in the Examples below. The synergistic effects obtainable by having at least different types of polyethylene polymers coupled enables use of recycled polymer waste to achieve comparable or even better mechanical properties compared to polymer compositions wherein the different types of polyethylene are not coupled or virgin polymers (with the concomitant environmental benefits). Moreover, the coupling effect means that less polymer (recycled or virgin) can be used (i.e., by replacing a portion with the functional filler) without adversely effecting mechanical properties and, in some embodiments, improving mechanical properties (with the concomitant cost benefits).

In certain embodiments, the polymer composition has a density of greater than about 0.90 g/cm$^3$ to equal to or less than about 1.15 g/cm$^3$, for example, greater than about 1.00 g/cm$^3$ to equal to or less than about 1.10 g/cm$^3$, for example, a density of greater than about 1.00 g/cm$^3$ to equal to or less than about 1.05 g/cm$^3$, or a density of from about 1.00 to about 1.04 g/cm$^3$, or from about 1.00 to about 1.03 g/cm$^3$, or from about 1.00 to about 1.02 g/cm$^3$, or a density of about 1.01 g/cm$^3$. In certain embodiments, the polymer composition has a density of greater than about 1.00 to equal to or less than about 1.05 g/cm$^3$. Density may be determined in accordance with ISO1183.

The polymer composition may characterized by thermal analysis, for example, by differential scanning calorimetry (DSC). In certain embodiments, the DSC thermogram of the polymer composition differs from the DSC thermogram of a comparable composition comprising at least two polyethylene polymers which are not both coupled.

Articles of Manufacture

The articles which may be formed from the polymer compositions are many and various. Articles of manufacture include components such as, for example, industrial, commercial and residential piping and tubing, including underground water and sewage pipes, surface ground water piping, cable protection piping, piping for plumbing, and guttering for buildings, for example, commercial or residential buildings, pallets (including, for example, those used to cover or bridge across surface defects in roads or pavements, or pallets used in storage and transport of goods), garden decking materials, roads, pavements, paths, walkways and bridge decks, or sections thereof.

In one embodiment, the polymer composition is suitable for industrial uses such as piping uses. In certain embodiments, therefore, the article of manufacture is a pipe.

Unexpectedly, it has been found that the polymer compositions described herein can be used to manufacture pipes having advantageous mechanical properties. For example, as the diameter of a pipe made from a filled polymer increases, there is a tendency for the stiffness (i.e., deformation under load) of the pipe to decline. Pipe stiffness may be characterized in terms of a Stiffness Number (SN) according to EN ISO 9969. SNs range from 1 to 16, with 16 being the stiffest. Owing to this it may be necessary to add additional polymer components which compensate for the reduction in stiffness and/or use less filler, which increases costs because polymer is generally more expensive than filler. Surprisingly, it has been found that pipes made from the polymer compositions according to embodiments described herein exhibit high stiffness, even at relatively large diameters. For example, it is possible to manufacture a twin-walled corrugated pipe having a diameter of greater than 400 mm, from a composition which is 100% polymer composition according to embodiments described herein, having a SN of 8.

In certain embodiments, the pipe is a corrugated pipe. In certain embodiments, the pipe is twin-walled, for example, a corrugated twin-walled pipe. In certain embodiments, the pipe is single-walled, for example, a corrugated single-walled pipe In embodiments in which the pipe is twin-walled at least one of the walls may be formed from the polymer composition according to the embodiments described herein. In certain embodiments, both walls of a twin-walled pipe are formed from a polymer composition according to the embodiments described herein.

In certain embodiments, the pipe has a nominal inside diameter of up to about 1000 mm, for example, up to about 800 mm, or up to about 700 mm, or up to about 600 mm, or up to about 500 mm, or up to about 400 mm, or up to about 300 mm, or up to about 200 mm. In certain embodiments, the pipe has a diameter of at least about 400 mm, or greater than about 400 mm, for example, from equal to or greater than about 400 mm up to about 700 mm, for example up to about 650 mm, or up to about 600, or up to about less than 600 mm. Such a pipe may be single walled or twin walled.

In certain embodiments, the article of manufacture is a road (e.g., motorway, highway, A-road, B-road, C-road, trunk road, minor road, and the like), pavement, path, walkway or bridge deck (e.g., a deck for a vehicle- or foot-bridge), and the like. Such articles may be prefabricated. In certain embodiments, the article of manufacture is a section of, or an insert for, a road, pavement, path, walkway or bridge deck, e.g., a flyover, or level crossing, or repair piece for a pothole, or cattle grid. In certain embodiments, such articles have a hollow core that can accommodate, for example, cables, pipes and rainwater. In certain embodiments a surface, for example, an upper surface, of such an article is roughened to increase friction between the surface and the user (e.g., vehicle or subject) and, thus reduce or eliminate slippage. Roughening may be performed during manufacture of the article, e.g., by moulding or extruding the article such that a surface is has regular or irregular raised portions, or by embedding particular matter, e.g., crushed stone, sand, and the like, in a surface.

Further, in certain embodiments, owing, at least in part, to the advantageous mechanical properties offered by the polymer composition, efficiencies in manufacturing processes may be obtainable because the same starting polymer composition can be used to manufacture at least two different types of article of manufacture from a mixed polyolefin feed. This is possible owing in part to the coupling effect of the least two polyethylene polymers and the synergistic improvements in mechanical properties discussed above. This coupling effect can extend to other polymer types present in the polymer composition, for example, to polypropylene and other polyethylene polymers such as LDPE and LLDPE. As such, the coupling effect generally improves compatibilization of different polymer types, enabling manufacture of polymer articles with acceptable, or even improved, mechanical properties, from a mixed recycled polymer streams. Thus, in certain embodiments, there is provided a method of making at least two different types of article of manufacture from the same starting material, said method comprising (i) providing a starting material which is a polymer composition comprising at least two types of HDPE and a filler comprising inorganic particulate having a coating on the surface of the inorganic particulate, (ii) forming a first type of article of manufacture from the starting material, and (iii) forming at least a second type of article of manufacture from the starting material.

In certain embodiment, the first and second type of article are pipes having different diameters, or may be the inner and outer walls of a twin-walled pipe.

The flexibility of pipes manufactured from the polymer composition according to certain embodiments described herein increases less as the temperature increase compared to a pipe made from a comparable polymer composition in which both polyethylene polymers are not coupled. This is advantageous when laying pipes in very hot conditions, e.g., at ground air temperatures of greater than about 30° C.

The Functional Filler

In certain embodiments, the functional filler comprises an inorganic particulate and a surface treatment agent comprising a first compound including a terminating propanoic group or ethylenic group with one or two adjacent carbonyl groups. The surface treatment agent may be coated on the surface of the inorganic particulate. The purpose of the surface treatment agent (e.g., coating) is to improve the compatibility of the inorganic particulate filler and the polymer matrix with which it is to be combined, and/or improve the compatibility of two or more different polymers in the recycled polymer composition by cross-linking or grafting the different polymers. In recycled polymer compositions comprising recycled and virgin polymer, the functional filler coating may serve to cross-link or graft the different polymers.

In other aspects and embodiments of the present invention, the coating additionally comprises a second compound selected from the group consisting of one or more fatty acids and one or more salts of fatty acids, for example, stearic acid or calcium stearate.

The Inorganic Particulate Material

The inorganic particulate material may, for example, be an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, talc, mica, perlite or diatomaceous earth, or magnesium hydroxide, or aluminium trihydrate, or combinations thereof.

A preferred inorganic particulate material for use in the method according to the first aspect of the present invention is calcium carbonate. Hereafter, the invention may tend to be discussed in terms of calcium carbonate, and in relation to aspects where the calcium carbonate is processed and/or treated. The invention should not be construed as being limited to such embodiments.

The particulate calcium carbonate used in the present invention may be obtained from a natural source by grinding. Ground calcium carbonate (GCC) is typically obtained by crushing and then grinding a mineral source such as chalk, marble or limestone, which may be followed by a particle size classification step, in order to obtain a product having the desired degree of fineness. Other techniques such as bleaching, flotation and magnetic separation may also be used to obtain a product having the desired degree of fineness and/or colour. The particulate solid material may be ground autogenously, i.e. by attrition between the particles of the solid material themselves, or, alternatively, in the presence of a particulate grinding medium comprising particles of a different material from the calcium carbonate to be ground. These processes may be carried out with or without the presence of a dispersant and biocides, which may be added at any stage of the process.

Precipitated calcium carbonate (PCC) may be used as the source of particulate calcium carbonate in the present invention, and may be produced by any of the known methods available in the art. TAPPI Monograph Series No 30, "Paper Coating Pigments", pages 34-35 describes the three main commercial processes for preparing precipitated calcium carbonate which is suitable for use in preparing products for use in the paper industry, but may also be used in the practice of the present invention. In all three processes, a calcium carbonate feed material, such as limestone, is first calcined to produce quicklime, and the quicklime is then slaked in water to yield calcium hydroxide or milk of lime. In the first process, the milk of lime is directly carbonated with carbon dioxide gas. This process has the advantage that no by-product is formed, and it is relatively easy to control the properties and purity of the calcium carbonate product. In the second process the milk of lime is contacted with soda ash to produce, by double decomposition, a precipitate of calcium carbonate and a solution of sodium hydroxide. The sodium hydroxide may be substantially completely separated from the calcium carbonate if this process is used commercially. In the third main commercial process the milk of lime is first contacted with ammonium chloride to give a calcium chloride solution and ammonia gas. The calcium chloride solution is then contacted with soda ash to produce by double decomposition precipitated calcium carbonate and a solution of sodium chloride. The crystals can be produced in a variety of different shapes and sizes, depending on the specific reaction process that is used. The three main forms of PCC crystals are aragonite, rhombohedral and scalenohedral, all of which are suitable for use in the present invention, including mixtures thereof.

Wet grinding of calcium carbonate involves the formation of an aqueous suspension of the calcium carbonate which may then be ground, optionally in the presence of a suitable dispersing agent. Reference may be made to, for example, EP-A-614948 (the contents of which are incorporated by reference in their entirety) for more information regarding the wet grinding of calcium carbonate. The inorganic particulate, e.g., calcium carbonate, may also be prepared by any suitable dry grinding technique.

In some circumstances, additions of other minerals may be included, for example, one or more of kaolin, calcined kaolin, wollastonite, bauxite, talc, titanium dioxide or mica, could also be present.

When the inorganic particulate material is obtained from naturally occurring sources, it may be that some mineral impurities will contaminate the ground material. For example, naturally occurring calcium carbonate can be present in association with other minerals.

Thus, in some embodiments, the inorganic particulate material includes an amount of impurities. In general, however, the inorganic particulate material used in the invention will contain less than about 5% by weight, preferably less than about 1% by weight, of other mineral impurities.

Unless otherwise stated, particle size properties referred to herein for the inorganic particulate materials are as measured by the well known conventional method employed in the art of laser light scattering, using a CILAS 1064 instrument (or by other methods which give essentially the same result). In the laser light scattering technique, the size of particles in powders, suspensions and emulsions may be measured using the diffraction of a laser beam, based on an application of Mie theory. Such a machine provides measurements and a plot of the cumulative percentage by volume of particles having a size, referred to in the art as the 'equivalent spherical diameter' (e.s.d), less than given e.s.d values. The mean particle size d50 is the value determined in this way of the particle e.s.d at which there are 50% by volume of the particles which have an equivalent spherical diameter less than that d50 value. The term d90 is the particle size value less than which there are 90% by volume of the particles.

The d50 of the inorganic particulate may be less than about 100 μm, for example, less than about 80 μm for example, less than about 60 μm for example, less than about 40 μm, for example, less than about 20 μm, for example, less than about 15 μm, for example, less than about 10 μm, for example, less than about 8 μm, for example, less than about 6 μm, for example, less than about 5 μm, for example, less than about 4, for example, less than about 3 μm, for example less than about 2 μm, for example, less than about 1.5 μm or, for example, less than about 1 μm. The d50 of the inorganic particulate may be greater than about 0.5 μm, for example, greater than about 0.75 μm greater than about 1 μm, for example, greater than about 1.25 μm or, for example, greater than about 1.5 μm. The d50 of the inorganic particulate may be in the range of from 0.5 to 20 μm, for example, from about 0.5 to 10 μm, for example, from about 1 to about 5 μm, for example, from about 1 to about 3 μm, for example, from about 1 to about 2 μm, for example, from about 0.5 to about 2 μm or, for example, from about 0.5 to 1.5 μm, for example, from about 0.5 to about 1.4 μm, for example, from about 0.5 to about 1.4 μm, for example, from about 0.5 to about 1.3 μm, for example, from about 0.5 to about 1.2 μm, for example, from about 0.5 to about 1.1 μm, for example, from about 0.5 to about 1.0 μm, for example, from about 0.6 to about 1.0 μm, for example, from about 0.7 to about 1.0 μm, for example about 0.6 to about 0.9 μm, for example, from about 0.7 to about 0.9 μm.

The d90 (also referred to as the top cut) of the inorganic particulate may be less than about 150 μm, for example, less than about 125 μm for example, less than about 100 μm for example, less than about 75 μm, for example, less than about 50 μm, for example, less than about 25 μm, for example, less than about 20 μm, for example, less than about 15 μm, for example, less than about 10 μm, for example, less than about 8 μm, for example, less than about 6 μm, for example, less than about 4 μm, for example, less than about 3 μm or, for example, less than about 2 μm. Advantageously, the d90 may be less than about 25 μm.

The amount of particles smaller than 0.1 μm is typically no more than about 5% by volume.

The inorganic particulate may have a particle steepness equal to or greater than about 10. Particle steepness (i.e., the steepness of the particle size distribution of the inorganic particulate) is determined by the following formula:

$$\text{Steepness} = 100 \times (d_{30}/d_{70}),$$

wherein d30 is the value of the particle e.s.d at which there are 30% by volume of the particles which have an e.s.d less than that $d_{30}$ value and d70 is the value of the particle e.s.d. at which there are 70% by volume of the particles which have an e.s.d. less that that $d_{70}$ value.

The inorganic particulate may have a particle steepness equal to or less than about 100. The inorganic particulate may have a particle steepness equal to or less than about 75, or equal to or less than about 50, or equal to or less than about 40, or equal to or less than about 30. The inorganic particulate may have a particle steepness from about 10 to about 50, or from about 10 to about 40.

The inorganic particulate is treated with a surface treatment agent, i.e., a coupling modifier, such that the inorganic particulate has a surface treatment on its surface. In certain embodiments, the inorganic particulate is coated with the surface treatment agent.

The polymer composition may contain one or more secondary filler components, if desired. The secondary filler component may not be treated with a surface treatment agent. Such additional components, where present, are suitably selected from known filler components for polymer compositions. For example, the inorganic particulate used in the functional filler may be used in conjunction with one more other known secondary filler components, such as for example, titanium dioxide, carbon black and talc. In certain embodiments, the polymer composition comprises talc as a secondary filler component. In certain embodiments, the weight ration of inorganic particulate to secondary filler component is from about 1:1 to about 10:1, for example, from about 1:1 to about 5:1, or from about 2:1 to about 4:1. In certain embodiments, the inorganic particulate of the functional filler is calcium carbonate, for example, ground calcium carbonate, and the secondary filler component is uncoated talc. When a secondary filler component is used, it may be present in an amount of from about 0.1% to about 50% by weight of the polymer composition, for example, from about 1% to about 40% by weight, or from about 2% to about 30% by weight, or from about 2% to about 25% by weight, or from about 2% to about 20% by weight, or from about 3% to about 15% by weight, or from about 4% to about 10% by weight of the polymer composition.

The Surface Treatment Agent

The surface treatment agent comprises a compound including a terminating propanoic group or ethylenic group with one or two adjacent carbonyl groups (also referred to herein as a coupling modifier). A function of the surface treatment agent is to couple polymeric species present in the polymer composition, i.e., to couple at least the at least two polyethylene polymers. Without wishing to be bound by theory, it is believed that coupling involves a physical (e.g., steric) and/or chemical (e.g., chemical bonding, such as covalent or van der Waals) interaction between the polymers and the surface treatment agent.

In one embodiment, the surface treatment agent (i.e., coupling modifier) has a formula (1):

A-(X—Y—CO)$_m$(O—B—CO)$_n$OH　　　(1)

wherein
　A is a moiety containing a terminating ethylenic bond with one or two adjacent carbonyl groups;
　X is O and m is 1 to 4 or X is N and m is 1;
　Y is $C_{1-18}$-alkylene or $C_{2-18}$-alkenylene;
　B is $C_{2-6}$-alkylene; n is 0 to 5;
　provided that when A contains two carbonyl groups adjacent to the ethylenic group, X is N.

In an embodiment, A-X— is the residue of acrylic acid, optionally wherein (O—B—CO)$_n$ is the residue of δ-valerolactone or ε-caprolactone or a mixture thereof, and optionally wherein n is zero.

In another embodiment, A-X— is the residue of maleimide, optionally wherein (O—B—CO)$_n$ is the residue of δ-valerolactone or ε-caprolactone or a mixture thereof, and optionally wherein n is zero.

Specific examples of coupling modifiers are β-carboxy ethylacrylate, β-carboxyhexylmaleimide, 10-carboxydecylmaleimide and 5-carboxy pentyl maleimide.

Exemplary coupling modifiers and there methods of preparation are described in U.S. Pat. No. 7,732,514, the entire contents of which is hereby incorporated by reference.

In another embodiment, the coupling modifier is β-acryloyloxypropanoic acid or an oligomeric acrylic acid of the formula (2):

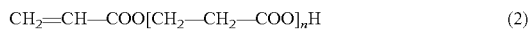

CH$_2$=CH—COO[CH$_2$—CH$_2$—COO]$_n$H　　　(2)

wherein n represents a number from 1 to 6.
In an embodiment, n is 1, or 2, or 3, or 4, or 5, or 6.

The oligomeric acrylic acid of formula (2) may be prepared by heating acrylic acid in the presence of 0.001 to 1% by weight of a polymerization inhibitor, optionally under elevated pressure and in the presence of an inert solvent, to a temperature in the range from about 50° C. to 200° C. Exemplary coupling modifiers and their methods of preparation are described in U.S. Pat. No. 4,267,365, the entire contents of which is hereby incorporated by reference.

In another embodiment, the coupling modifier is β-acryloyloxypropanoic acid. This species and its method of manufacture is described in U.S. Pat. No. 3,888,912, the entire contents of which is hereby incorporated by reference.

The surface treatment agent is present in the functional filler in an amount effective to achieve the desired result. This will vary between coupling modifiers and may depend upon the precise composition of the inorganic particulate. For example, the coupling modifier may be present in an amount equal to or less than about 5 wt. % based on the total weight of the functional filler, for example equal to or less than about 2 wt. % or, for example equal to or less than about 1.5 wt. %. In an embodiment, the coupling modifier is present in the functional filler in an amount equal to or less than about 1.2 wt. % based on the total weight of the functional filler, for example equal to or less than about 1.1 wt. %, for example equal to or less than about 1.0 wt. %, for example, equal to or less than about 0.9 wt. %, for example equal to or less than about 0.8 wt. %, for example equal to or less than about 0.7 wt. %, for example, less than or equal to about 0.6 wt. %, for example equal to or less than about 0.5 wt %, for example equal to or less than about 0.4 wt. %, for example equal to or less than about 0.3 wt. %, for example equal to or less than about 0.2 wt. % or, for example less than about 0.1 wt. %. Typically, the coupling modifier is present in the functional filler in an amount greater than about 0.05 wt. %. In further embodiments, the coupling modifier is present in the functional filler in an amount ranging from about 0.1 to 2 wt. % or, for example, from about 0.2 to about 1.8 wt. %, or from about 0.3 to about 1.6 wt. %, or from about 0.4 to about 1.4 wt. %, or from about 0.5 to about 1.3 wt. %, or from about 0.6 to about 1.2 wt. %, or from about 0.7 to about 1.2 wt. %, or from about 0.8 to about 1.2 wt. %, or from about 0.8 to about 1.1 wt. %.

In certain embodiments, a compound/compounds including a terminating propanoic group or ethylenic group with one or two adjacent carbonyl groups is/are the sole species present in the surface treatment agent.

In certain embodiments, the surface treatment agent additionally comprises a second compound selected from the group consisting of one or more fatty acids and one or more salts of fatty acids, and combinations thereof.

In one embodiment, the one or more fatty acids is selected from the group consisting of lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic, erucic acid, docosahexaenoic acid and combinations thereof. In another embodiment, the one or more fatty acids is a saturated fatty acid or an unsaturated fatty acid. In another embodiment, the fatty acid is a $C_{12}$-$C_{24}$ fatty acid, for example, a $C_{16}$-$C_{22}$ fatty acid, which may be saturated or unsaturated. In one embodiment, the one or more fatty acids is stearic acid, optionally in combination with other fatty acids.

In another embodiment, the one or more salts of a fatty acid is a metal salt of the aforementioned fatty acids. The metal may be an alkali metal or an alkaline earth metal or zinc. In one embodiment, the second compound is calcium stearate.

The second compound, when present, is present in the functional filler in an amount effective to achieve the desired result. This will vary between coupling modifiers and may depend upon the precise composition of the inorganic particulate. For example, the second compound may be present in an amount equal to or less than about 5 wt. % based on the total weight of the functional filler, for example equal to or less than about 2 wt. % or, for example equal to or less than about 1 wt. %. In an embodiment, the, second compound is present in the functional filler in an amount equal to or less than about 0.9 wt. % based on the total weight of the functional filler, for example equal to or less than about 0.8 wt. %, for example equal to or less than about 0.7 wt. %, for example, less than or equal to about 0.6 wt. %, for example equal to or less than about 0.5 wt %, for example equal to or less than about 0.4 wt. %, for example equal to or less than about 0.3 wt. %, for example equal to or less than about 0.2 wt. % or, for example equal to or less than about 0.1 wt. %. Typically, the second compound, if present, is present in the functional filler in an amount greater than about 0.05 wt. %. The weight ratio of the coupling modifier to the second compound may be from about 5:1 to about 1:5, for example, from about 4:1 to about 1:4, for example, from about 3:1 to about 1:3, for example, from about 2:1 to about 1:2 or, for example, about 1:1.

The amount of coating, comprising the first compound (i.e., the coupling modifier) and the second compound (i.e., the one more fatty acids or salts thereof), may be an amount which is calculated to provide a monolayer coverage on the surface of the inorganic particulate. In embodiments, the weight ratio of the first compound to the second compound is from about 4:1 to about 1:3, for example from about 4:1 to about 1:2, for example from about 4:1 to about 1:1, for example from about 4:1 to about 2:1, for example, from about 3.5:1 to about 1:1, for example from about 3.5:1 to 2:1 or, for example, from about 3.5:1 to about 2.5:1

In certain embodiments, the surface treatment agent does not comprise a compound selected from the group consisting of one or more fatty acids and one or more salts of a fatty acid.

The polymer composition may additionally comprise a peroxide-containing additive. In an embodiment, the peroxide-containing additive comprises di-cumyl peroxide or 1,1-Di(tert-butylperoxy)-3,3,5-trimethylcyclohexane. The peroxide-containing additive may not necessarily be included with the surface treatment agent and instead may be added during the compounding of the functional filler and the polymer, as described below. In some polymer systems, e.g., those containing HDPE, the inclusion of a peroxide-containing additive may promote cross-linking of the polymer chains. In other polymer systems, e.g., polypropylene, the inclusion of a peroxide-containing additive may promote polymer chain scission. The peroxide-containing additive may be present in amount effective to achieve the desired result. This will vary between coupling modifiers and may depend upon the precise composition of the inorganic particulate and the polymer. For example, the peroxide-containing additive may be present in an amount equal to or less than about 1 wt. % based on the weight of the polymer in the polymer composition to which the peroxide-containing additive is to be added, for example, equal to or less than about 0.5 wt. %, for example, 0.1 wt %, for example equal to or less than about 0.09 wt. %, or for example equal to or less than about 0.08 wt. % or for example, equal to or less than about 0.06 wt. %. Typically, the peroxide-containing additive, if present, is present in an amount greater than about 0.01 wt. % based on the weight of the polymer.

The functional filler may be prepared by combining the inorganic particulate, surface treatment agent and optional peroxide-containing additive and mixing using conventional methods, for example, using a Steele and Cowlishaw high intensity mixer, preferably at a temperature equal to or less than 80° C. The compound(s) of the surface treatment agent may be applied after grinding the inorganic particulate, but before the inorganic particulate is added to the optionally recycled polymer composition. For example, the surface treatment agent may be added to the inorganic particulate in a step in which the inorganic particulate is mechanically de-aggregated. The surface treatment agent may be applied during de-aggregation carried out in a milling machine.

Optional Additional Filler Components

The functional filler may additionally comprise an antioxidant. Suitable antioxidants include, but are not limited to, organic molecules consisting of hindered phenol and amine derivatives, organic molecules consisting of phosphates and lower molecular weight hindered phenols, and thioesters. Exemplary antioxidants include Irganox 1010 and Irganox 215, and blends of Irganox 1010 and Irganox 215.

Method of Making Polymer Composition

In certain embodiments, the polymer composition is made by a method comprising compounding the at least two polyethylene polymers with the functional filler.

Compounding per se is a technique which is well known to persons skilled in the art of polymer processing and manufacture. It is understood in the art that compounding is distinct from blending or mixing processes conducted at temperatures below that at which the constituents become molten.

Such methods include compounding and extrusion. Compounding may be carried out using a twin screw compounder, for example, a Baker Perkins 25 mm twin screw compounder. The polymers, functional filler and optional peroxide containing additive may be premixed and fed from a single hopper. The resulting melt may be cooled, for example, in a water bath, and then pelletized.

The compounded compositions may further comprise additional components, such as slip aids (for example Erucamide), process aids (for example Polybatch® AMF-705), mould release agents and antioxidants. Suitable mould release agents will be readily apparent to one of ordinary skill in the art, and include fatty acids, and zinc, calcium, magnesium and lithium salts of fatty acids and organic phosphate esters. Specific examples are stearic acid, zinc stearate, calcium stearate, magnesium stearate, lithium stearate, calcium oleate and zinc palmitate. Slip and process aids, and mould release agents may be added in an amount less than about 5 wt. % based on the weight of the masterbatch. Polymer articles, including those described above, may then be extruded, compression moulded or injected moulded using conventional techniques known in the art, as will be readily apparent to one of ordinary skill in the art.

In certain embodiments, the at least two polyethylene polymers are each contained in separate polymer streams, and are fed to the compounder separately. For example, the first polyethylene comprising HDPE is fed to the compounder as a first polymer stream, the second polyethylene polymer is fed to the compound as a second polymer stream, and the functional filler is fed to the compounder as a third stream. In such embodiments, the second polymer stream comprising the second polyethylene polymer may be part of a polymer stream comprising other polymer components, for example, polypropylene, LDPE and/or LLDPE. In other embodiments, any other polymer components may be fed to the compounder via separate feed streams.

In certain embodiments, the at least two polyethylene polymers are part of the same polymer stream. Thus, in such embodiments, a single feed stream comprising at least the two polyethylene polymers, and optionally including other polymer components, such as polypropylene, LDPE and/or LLDPE, is fed to the compounder.

In certain embodiments, the functional filler is not contacted with a polymer prior to compounding with the at least two polyethylene polymers.

The relative amounts of each component will be such as to prepare a polymer composition according to the present invention.

Advantageously, because the at least two polyethylene polymers are included in the polymer composition during manufacture and the polymer composition exhibits favourable mechanical properties, the need for further blending of polymer components during the manufacture of articles from the polymer composition (e.g., at a customer's facility) may be reduced or eliminated, i.e., mitigated.

Thus, provided is a method of mitigating blending of polymer components during the manufacture of an article of manufacture, said method comprising (i) providing a preformed polymer composition comprising at least two types of HDPE and a functional filler comprising inorganic particulate having a surface treatment agent on a surface of the inorganic particulate, and (ii) forming an article of manufacture therefrom.

The article of manufacture may be any of the articles of manufacture described herein.

Article manufacture will typically take place in a plant suitable for the manufacture of said article and, thus, in certain embodiments, there is provided a method of mitigating blending of polymer components at a plant for the manufacture of the article of manufacture. Thus, masterbatches including coupled polymers would not need to be mixed with additional polymer before manufacture of articles using the masterbatches (e.g., mixing of additional polymer for improvement of the mechanical properties of the articles). Being able to use the polymer composition to make articles without further blending of components is advantageous because it reduces raw materials costs (because less or no further raw materials are required beyond the polymer composition), reduces plant costs (because the manufacturer does not necessarily need to have blending equipment on site and less energy will be required), reduces energy usage with the associated environmental benefits.

For the avoidance of doubt, the present application is directed to the subject-matter described in the following numbered paragraphs:

1. A polymer composition comprising:
at least two polyethylene polymers, and
a functional filler comprising inorganic particulate and a surface treatment agent on a surface of the inorganic particulate;
wherein a first of the at least two polyethylene polymers comprises HDPE.

1A. A polymer composition according to paragraph 1, wherein the at least two polyethylene polymers are coupled.

2. A polymer composition according to paragraph 1 or 1A, wherein the polyethylene polymers are recycled polymers, for example, recycled post-consumer polymer waste.

3. A polymer composition according to paragraph 1, 1A or 2, wherein the polymer composition has (i) a resilience @ −20° C. greater than 60 kJ/m², and/or (ii) an elongation at break of greater than 32%, and/or (iii) a flexural modulus greater than 800 MPa.

4. A polymer composition according to any preceding numbered paragraph, wherein the second of the at least two polyethylene polymers comprises HDPE, wherein the HDPE of the second polyethylene polymer is different than the HDPE of the first polyethylene polymer.

5. A polymer composition according to any preceding numbered paragraph, wherein the first of the at least two polyethylene polymers has an MFR of less than 0.75 g/10 mins @ 190° C./2.16 kg, optionally wherein the second of the at least two polyethylene polymers has an MFR equal to or greater than 0.75 g/10 mins @ 190° C./2.16 kg.

6. A polymer composition according to any preceding numbered paragraph, wherein the HDPE of the first polyethylene polymer is blow-moulded HDPE, for example, recycled blow-moulded HDPE.

7. A polymer composition according to any preceding numbered paragraph, further comprising polypropylene, optionally wherein the polypropylene is recycled polypropylene.

8. A polymer composition according to any preceding numbered paragraph, wherein the inorganic particulate is an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, talc, mica, perlite or diatomaceous earth, or magnesium hydroxide, or aluminium trihydrate, or combinations thereof.

9. A polymer composition according to paragraph 8, wherein the inorganic particulate comprises or is calcium carbonate, for example, ground calcium carbonate.

10. A polymer composition according to paragraph 8, wherein the polymer composition further comprises a secondary filler which is not treated with a surface treatment agent, optionally wherein the secondary filler is talc.

11. A polymer composition according to any preceding numbered paragraph, wherein the surface treatment agent comprises a first compound including a terminating propanoic group or ethylenic group with one or two adjacent carbonyl groups.

12. A polymer composition according to paragraph 11, wherein the first compound has a formula (1):

$$A\text{-}(X\text{—}Y\text{—}CO)m(O\text{—}B\text{—}CO)n OH \qquad (1)$$

wherein
A is a moiety containing a terminating ethylenic bond with one or two adjacent carbonyl groups;
X is O and m is 1 to 4 or X is N and m is 1;
Y is C1-18-alkylene or C2-18-alkenylene;
B is C2-6-alkylene; n is 0 to 5;
provided that when A contains two carbonyl groups adjacent to the ethylenic group, X is N.

13. A polymer composition according to paragraph 11 or 12, wherein the surface treatment agent does not comprise a compound selected from the group consisting of one or more fatty acids and one or more salts of a fatty acid.

14. A polymer composition according to any preceding numbered paragraph, wherein the functional filler is present in an amount ranging from about 5% to about 25% by weight of the polymer composition.

15. A polymer composition according to any preceding numbered paragraph, wherein the HDPE of the first polyethylene polymer is present in amount ranging from about 10% to about 75% by weight of the polymer composition.

16. A masterbatch from which a polymer composition according to any preceding numbered paragraph may be formed.

17. A method of making an article of manufacture, said method comprising forming the article of manufacture from a polymer composition according to any one of numbered paragraphs 1-15.

18. A method of mitigating blending of polymer components during the manufacture of an article of manufacture, said method comprising (i) providing a pre-formed polymer composition comprising at least two types of HDPE and a functional filler comprising inorganic particulate having a surface treatment agent on a surface of the inorganic particulate, and (ii) forming an article of manufacture therefrom.

19. A method of mitigating blending of polymer components at a plant for the manufacture of an article of manufacture, said method comprising (i) providing, at the plant, a pre-formed polymer composition comprising at least two types of HDPE and a functional filler comprising inorganic particulate having a surface treatment agent on a surface of the inorganic particulate, and (ii) forming an article of manufacture therefrom at the plant.

20. A method of making at least two different types of article of manufacture from the same starting material, said method comprising (i) providing a starting material which is a polymer composition comprising at least two types of HDPE and a filler comprising inorganic particulate having a coating on the surface of the inorganic particulate, (ii) forming a first type of article of manufacture from the starting material, and (iii) forming at least a second type of article of manufacture from the starting material.

21. A method according to paragraph 20, wherein the first and second type of article are pipes having different diameters.

22. A method of improving a mechanical property of an article of manufacture, said method comprising forming the article of manufacture from a polymer composition comprising at least two polyethylene polymers, wherein the at least two polyethylene polymers are coupled to the functional filler, and wherein a first of the at least two polyethylene polymers comprises HDPE.

23. An article of manufacture formed from a polymer composition according to any one of numbered paragraphs 1-15.

24. An article of manufacture according to paragraph 23, wherein the article is a pipe.

25. Use of a functional filler comprising inorganic particulate and a surface treatment agent on a surface of the inorganic particulate in a polymer composition comprising at least two polyethylene polymers, wherein the at least two polyethylene polymers are coupled to the functional filler, and wherein a first of the at least two polyethylene polymers comprises HDPE.

26. Use of a polymer composition according to any one of numbered paragraphs 1-15 for improving a mechanical property of an article of manufacture formed therefrom.

27. A method of increasing the diameter of pipes while maintaining or improving the stiffness of the pipes, said method comprising forming the pipes from a polymer composition according to any one of numbered paragraphs 1-15.

28. A method of making a polymer composition according to any one of numbered paragraphs 1-15, comprising compounding the at least two polyethylene polymers with the functional filler.

29. A method according to paragraph 28, wherein the at least two polyethylene polymers are each contained in separate polymer streams.

30. A method according to paragraph 28, wherein the at least two polyethylene polymers are part of the same polymer stream.

31. A method according to any one of paragraphs 28-30, wherein the functional filler is not contacted with a polymer prior to compounding with the at least two polyethylene polymers.

A Pipe Having at Least One Wall, the Pipe Having a Nominal Inside Diameter of at Least about 400 mm and a SN of at Least about 4

It has surprisingly been found that large diameter pipes having industry acceptable mechanical properties can be manufactured from recycled polymers. More particularly, it has been found that pipes comprising recycled compositions according to embodiments described herein exhibit high stiffness, even at relatively large diameters This enables greater utilization of recycled polymers and less reliance on virgin polymer, providing cost and environmental benefits.

Thus, provided is a pipe having at least one wall, the pipe having a nominal inside diameter of at least about 400 mm and a Stiffness Number (SN) of at least about 4, determined in accordance with EN ISO 9969, and wherein the at least one wall comprises at least about 25% by weight of recycled polymer, based on the total weight of the at least one wall. In certain embodiments, the at least one wall comprises at least about 30% by weight of recycled polymer, for example, at least about 35% by weight of recycled polymer, or at least about 40% by weight of recycled polymer, or at least about 45% by weight of recycled polymer, or at least about 50% by weight of recycled polymer, or at least about 55% by weight of recycled polymer, or at least about 60% by weight of recycled polymer, or at least about 65% by weight of recycled polymer, or at least about 70% by weight of recycled polymer, or at least about 75% by weight of recycled polymer. In certain embodiments, the at least one wall comprises up to about 99% by weight recycled polymer, for example, up to about 95% by weight recycled polymer, or up to about 90% by weight recycled polymer, or up to about 85% by weight recycled polymer, or up to about 80% by weight recycled polymer, or up to about 75% by weight recycled polymer, based on the total weight of the at least one wall.

The pipe may be used for non-pressure underground drainage and sewage applications.

In certain embodiments, the pipe has a SN of at least about 5, or at least about 6, or at least about 7, or at least about 8. In certain embodiments, the pipe has a SN of no greater than about 16, or no greater than about 14, or no greater than about 12, or no greater than about 10. In such or certain embodiments, the pipe has a nominal inside diameter of up to about 1000 mm, for example, up to about 900 mm, or up to about 800 mm, or up to about 700 mm, or up to about 650 mm, or up to about 600 mm. In certain embodiments, the pipe has a nominal inside diameter of at least about 450 mm, or at least about 500 mm, or at least about 550 mm, or at least about 600 mm.

In certain embodiments, the pipe may be may be single-walled or twin-walled. In certain embodiments, the pipe is a corrugated pipe. In certain embodiments, the pipe is twin-walled, for example, a corrugated twin-walled pipe. In certain embodiments, the pipe is single-walled, for example, a corrugated single-walled pipe. In embodiments in which the pipe is twin-walled, the at least one wall may be the inner wall. In certain embodiments, the at least one wall is the outer wall. In certain embodiments, both the inner and outer wall may comprise at least about 25% by weight recycled polymer in accordance with embodiments described herein and may be formed from the compounded polymer resin composition according to the embodiments described herein. In certain embodiments, both walls of a twin-walled pipe are formed from a compounded polymer resin composition according to the embodiments described herein.

In certain embodiments, the at least one wall has a wall thickness of from about 0.5 mm to about 10 mm, for example, from about 1 mm to about 8 mm, or from about 2 mm to about 6 mm, or from about 2 mm to about 5 mm, or from about 2 mm to about 4 mm, or from about 3 mm to about 4 mm. In certain embodiments, the inner wall and outer wall of a twinned wall pipe each have, separately, a wall thickness of from about 0.5 mm to about 10 mm, for example, from about 1 mm to about 8 mm, or from about 2 mm to about 6 mm, or from about 2 mm to about 5 mm, or from about 2 mm to about 4 mm, or from about 3 mm to about 4 mm. In such embodiments, the inner and outer walls may be of the same or a different wall thickness.

In certain embodiments, the pipe meets one or more, or all, of the requirements of standard BS EN 13476-3:2007+A1:2009, in so far as the standard relates to pipes for non-pressure underground drainage and sewage.

Besides SN, the pipe may be characterised in terms of other advantageous mechanical properties, for example, impact strength (also known as resilience, as may be determined by measuring unnotched Charpy impact strength @ −20° C. in accordance with ISO179) and elongation at break (as may be determined in accordance with ISO178).

In certain embodiments, the at least one wall of the pipe has:
  (v) an impact strength of greater than 70 kJ/m² @ −20° C.; and/or
  (vi) an elongation at break of greater than 10.

In certain embodiments, the at least one wall of the pipe has:
  (i) an impact strength of greater than 120 kJ/m² @ −20° C.; and/or
  (ii) an elongation at break of greater than 60.

The mechanical properties of the at least one wall and, thus, of the pipe, may be further enhanced by the incorporation of an impact modifier. An impact modifier is an additive which enhances the impact strength and elongation at break of a single-wall or twin-wall pipe having a nominal inside diameter of at least about 400 mm.

Thus, in certain embodiments, the at least one wall comprises an impact modifier, for example, up to about 20% by weight of an impact modifier, based on the total weight of recycled polymer and functional filler, for example, from about 0.1% by weight to about 20% by weight, or from about 0.5% by weight to about 15% by weight, or from about 1% by weight to about 12.5% by weight, or from about 2% by weight to about 12. % % by weight, or from about 1% by weight to about 10% by weight, or from about 1% by weight to about 8% by weight, or from about 1% by weight to about 6% by weight, or from about 1% by weight to about 4% by weight of an impact modifier, based on the total weight of recycled polymer and optional functional filler.

In certain embodiments, the impact modifier is an elastomer, for example, a polyolefin elastomer. In certain embodiments, the polyolefin elastomer is a copolymer of ethylene and another olefin (e.g., an alpha-olefin), for example, octane, and/or or butene and/or styrene.

In certain embodiments, the impact modifier is a copolymer of ethylene and octene. In certain embodiments, the impact modifier is a copolymer of ethylene and butene.

In certain embodiments, the impact modifier, for example, polyolefin copolymer as described above, such as an ethylene-octene copolymer, has a density of from about 0.80 to about 0.95 g/cm³ and/or a melt flow rate (MFR) of from about 0.2 g/10 min (2.16 kg@190° C.) to about 30 g/10 min (2.16 kg@190° C.), for example, from about 0.5 g/10 min (2.16 kg@190° C.) to about 20 g/10 min (2.16 kg@190° C.), or from about 0.5 g/10 min (2.16 kg@190° C.) to about 15 g/10 min (2.16 kg@190° C.), or from about 0.5 g/10 min (2.16 kg@190° C.) to about 10 g/10 min (2.16 kg@190° C.), or from about 0.5 g/10 min (2.16 kg@190° C.) to about 7.5 g/10 min (2.16 kg@190° C.), or from about 0.5 g/10 min (2.16 kg@190° C.) to about 5 g/10 min (2.16 kg@190° C.), or from about 0.5 g/10 min (2.16 kg@190° C.) to about 4 g/10 min (2.16 kg@190° C.), or from about 0.5 g/10 min (2.16 kg@190° C.) to about 3 g/10 min (2.16 kg@190° C.), or from about 0.5 g/10 min (2.16 kg@190° C.) to about 2.5 g/10 min (2.16 kg@190° C.), or from about 0.5 g/10 min (2.16 kg@190° C.) to about 2 g/10 min (2.16 kg@190° C.), or from about 0.5 g/10 min (2.16 kg@190° C.) to about 1.5 g/10 min (2.16 kg@190° C.). MFR may be determined in accordance with ISO1133. In such or certain embodiments, the impact modifier is an ethylene-octene copolymer having a density of from about 0.85 to about 0.86 g/cm³. Exemplary impact modifiers are polyolefin elastomers made by DOW under the Engage® brand, for example, Engage® 8842. In such embodiments, the compounded polymer resin may additionally comprise an antioxidant, as described herein.

In certain embodiments, the impact modifier is a copolymer based on styrene and butadiene, for example, a linear block copolymer based on styrene and butadiene. In such embodiments, the impact modifier may have a MFR of from about from about 1 to about 5 g/10 min (200° C. @ 5.0 kg), for example, from about 2 g/10 min (200° C. @ 5.0 kg) to about 4 g/10 min (200° C. @ 5.0 kg), or from about 3 g/10 min (200° C. @ 5.0 kg) to about 4 g/10 min (200° C. @ 5.0 kg). In such embodiments, the compound polymer resin may additionally comprise a peroxide-containing additive, such as di-cumyl peroxide, as described herein.

In certain embodiments, the impact modifier is a triblock copolymer based on styrene and ethylene/butene. In such embodiments, the impact modifier may have a MFR of from about 15 g/10 min (200° C. @ 5.0 kg) to about 25 g/10 min (200° C. @ 5.0 kg), for example, from about 20 g/10 min (200° C. @ 5.0 kg) to about 25 g/10 min (200° C. @ 5.0 kg).

In certain embodiments, the at least one wall of the pipe has an impact strength of at least about 100 kJ/m², for example, at least about 110 kJ/m², or at least about 120 kJ/m², or at least about 130 kJ/m² or at least about 150 kJ/m², or at least about 200 kJ/m², or at least about 250 kJ/m² or at least about 300 kJ/m² or at least about 350 kJ/m² or at least about 400 kJ/m². In certain embodiment, with the addition of at least about 2.5% by weight impact modifier, based on the total weight of recycled polymer and functional filler, the at least one wall of the pipe does not fail at 100% bend.

In certain embodiments, at least one wall has an elongation at break from about 20% to about 250%, for example, from about 40% to about 200%, or from about 40% to about 175%, or at least about 60%, or at least about 80%, or at least about 100%, or at least about 120%, or at least about 130%, or at least about 140%, or at least about 150%. Elongation at break may be determined in accordance with ISO178.

In certain embodiments, the pipe further comprises virgin polypropylene. In certain embodiments, the pipe comprises at least about 5% by weight virgin polypropylene, or at least about 10% by weight virgin polypropylene, or at least 20% by weight virgin polypropylene, based on the total weight of the pipe. In certain embodiments, the pipe comprises at least about 35% by weight virgin polypropylene, or at least about 50% by weight virgin polypropylene, or up to about 75% by weight virgin polypropylene. In certain embodiments in which the pipe comprises at least about 50% by weight virgin polypropylene, the pipe is a twin-walled pipe, wherein the at least one wall comprising at least about 25% by weight recycled polymer is either the inner wall or outer wall but not both of the inner or outer wall. In certain embodiments in which the pipe is a single walled pipe, the pipe comprises less than about 50% by weight virgin polypropylene, or less than about 35% by weight virgin polypropylene, or less than about 20% by weight virgin polypropylene, or less than about 10% by weight virgin polypropylene, or less than about 5% by weight of virgin polypropylene. In certain embodiments, the pipe is free of virgin polypropylene.

In certain embodiments, the pipe comprises HDPE from a source other than that of the recycled polymer described herein. For example, the pipe may comprise uncoupled HDPE. In certain embodiments, total amount of HDPE (be it derived from the recycled polymer described herein or HDPE from a source other than that of the recycled polymer described herein) in the pipe constitutes at least about 50% by weight of the pipe, for example, at least about 60% by weight of the pipe, or at least about 70% by weight of the pipe, or at least about 80% by weight of the pipe.

In certain embodiments, the recycled polymer comprises or is a mixture of different polymer types, for example, a mixture of polyethylene (PE) and polypropylene (PP), for example, a mixture of HDPE and PP, or a mixture of HDPE, PP and low density polyethylene, (LDPE), or a mixture of at least two different types of HDPE and PP, for example, a mixture of HDPE from blow moulded bottles, HDPE from sources other than blow moulded bottles, and PP.

In certain embodiments, the recycled polymer comprises at least two polyethylene polymers, and optionally a functional filler comprising inorganic particulate and a surface treatment agent on a surface of the inorganic particulate. The at least two polyethylene polymers are advantageously coupled, and a first of the at least two polyethylene polymers comprises HDPE (high density polyethylene). Without wishing to be bound by theory, it is believed that, when coupled, the at least two polyethylene polymers are coupled to the inorganic particulate via the surface treatment agent which, as described below, functions as a coupling modifier. The terms "first" and "second" used in connection with the at least two polyethylene polymers are used merely to distinguish between each of the at least two polyethylene polymers.

Generally, HDPE is understood to be a polyethylene polymer mainly of linear, or unbranched, chains with relatively high crystallinity and melting point, and a density of about 0.96 g/cm$^3$ or more. Generally, LDPE (low density polyethylene) is understood to be a highly branched polyethylene with relatively low crystallinity and melting point, and a density of from about 0.91 g/cm$^3$ to about 0.94 g/cm. Generally, LLDPE (linear low density polyethylene) is understood to be a polyethylene with significant numbers of short branches, commonly made by copolymerization of ethylene with longer-chain olefins. LLDPE differs structurally from conventional LDPE because of the absence of long chain branching.

In certain embodiments, the recycled polymer(s) is derived from post-consumer polymer waste, post-industrial polymer waste, and/or post-agricultural waste polymer. In certain embodiments, at least the polyethylene polymers are recycled post-consumer polymer waste.

In certain embodiments, at least the first of the polyethylene polymers comprises HDPE. In certain embodiments, the first of the polyethylene polymer comprises at least about 80% by weight HDPE, based on the total weight of the first polyethylene polymer, for example, at least about 85% HDPE, or at least about 90% HDPE, or at least about 95% HDPE. In certain embodiments, the first polyethylene polymer consists of, or consists essentially of, HDPE. In certain embodiments, the polyethylene polymer comprises less than 1% by weight of species other than HDPE, for example, less than about 0.5% by weight of species other than HDPE.

In certain embodiments, the first of the at least two polyethylene polymers has an MFR (melt flow rate) of less than 0.75 g/10 mins @ 190° C./2.16 kg, for example, an MFR of equal to or less than about 0.72 g/10 mins, or equal to or less than about 0.70 g/10 mins. In certain embodiments, the first of the at least two polyethylene polymers has an MFR of from about 0.10 to about 0.74 g/10 mins @ 190° C./2.16 kg, for example, from about 0.20 to about 0.70 g/10 mins, or from about 0.30 to about 0.60 g/10 mins, or from about 0.40 to about 0.50 g/10 mins, or from about 0.50 to about 0.74 g/10 mins, or from about 0.50 to about 0.70 g/10 mins, or from about 0.60 to about 0.74 g/10 mins, or from about 0.60 to about 0.70 g/10 mins. In certain embodiments, the first of the at least two polyethylene polymers has an MFR of at least about 0.02 g/10 min @ 190° C./2.16 kg. In certain embodiments, the first of at least two polyethylene polymers has an MFR of from about 0.30 to about 0.50 g/10 mins @ 190° C./2.16 kg. In certain embodiments, the first of at least two polyethylene polymers has an MFR of from about 0.35 to about 0.45 g/10 mins @ 190° C./2.16 kg.

In certain embodiments, the first polyethylene polymer is derived from blow-moulded polyethylene, i.e., the HDPE is blow-moulded HDPE, such as that contained or comprised in polyethylene bottles. Thus, in certain embodiments, the HDPE of the first polyethylene polymer is recycled blow-moulded polyethylene.

In certain embodiments, the second of the at least two polyethylene polymers comprises HDPE. The HDPE of the second polyethylene polymer is different than the HDPE of the first polyethylene polymer, for example, it may have shorter chain length and/or lower viscosity than the HDPE of the first polyethylene polymer. In certain embodiments, the second of the polyethylene polymer comprises at least about 50% by weight HDPE, based on the total weight of the second polyethylene polymer, for example, at least about 60% HDPE, or at least about 70% HDPE, or at least about 80% HDPE, or at least about 85% HDPE. In certain embodiments, the second polyethylene polymer comprises less than about 90% HDPE.

In certain embodiments, the second of the at least two polyethylene polymers has an MFR of equal to or greater than 0.75 g/10 mins @ 190° C./2.16 kg, for example, an MFR of at least about 0.77 g/10 mins, or at least 0.80 g/10 mins. In certain embodiments, the second of the at least two polyethylene polymers has an MFR of from about 0.75 to about 15 g/10 mins @ 190° C./2.16 kg, for example, from about 0.80 to about 10 g/10 mins, or from about 0.90 to about 8 g/10 min, or from about 0.90 to about 6 g/10 min, or from about 1.0 to about 4 g/10 min, or from about 1.0 to about 2.0 g/10 min. In certain embodiments, the second of the at least polyethylene polymers has an MFR of no greater than about 20 g/10 mins @ 190° C./2.16 kg. In certain embodiments, the second of the at least two polyethylene polymers has an MFR of from about 1.0 to about 2.0 g/10 min @ 190° C./2.16 kg. In certain embodiments, the second of the at least two polyethylene polymers has an MFR of from about 1.25 to about 1.75 g/10 min @ 190° C./2.16 kg.

In certain embodiments, the second polyethylene polymer is derived from injection-moulded polyethylene, i.e., the HDPE is injection-moulded HDPE. Thus, in certain embodiments, the HDPE of the second polyethylene polymer is recycled injection-moulded polyethylene.

In certain embodiments, the first of the at least two polyethylene polymers has an MFR of from about 0.30 to about 0.50 g/10 mins @ 190° C./2.16 kg, and the second of the at least two polyethylene polymers has an MFR of from about 1.0 to about 2.0 g/10 min @ 190° C./2.16 kg.

In certain embodiments, the total amount of HDPE present in the recycled polymer is from about 50% by weight to about 90% by weight of the recycled polymer, for example, from about 55% to about 85% by weight, or from about 60% to about 85% by weight, or from about 65% to about 85% by weight, or from about 70% to about 85% by weight, or from about 70% to about 80% by weight, or from about 75% to about 80% by weight of the recycled polymer.

In certain embodiments, the weight ratio of the HDPE of the first polyethylene polymer to the HDPE of the second polyethylene polymer is from about 0.5:1 to about 3:1, for example, from about 1:1 to about 3:1, or from about 1:1 to about 2:1, or from about 1:1 to about 3:2.

In certain embodiments, the recycled polymer comprises from about 10% to about 75% by weight of HDPE of the first polyethylene polymer, based on the total weight of the recycled polymer, for example, from about 20% to about 65% by weight, or from about 30% to about 65% by weight of HDPE of the first polyethylene polymer, and optionally from about 20% to about 45% of the HDPE of the second polyethylene polymer. In certain embodiments, the recycled polymer comprises from about 35% to about 55% by weight of the HDPE of the first polyethylene polymer and from about 25% to about 40% by weight of the HDPE of the first polymer. In certain embodiments, the recycled polymer comprises from about 40% to about 50% by weight of the HDPE of the first polyethylene polymer and from about 25 to about 35% by weight of the HDPE of the second polyethylene polymer. In certain embodiments, the recycled polymer comprises from about 42 to about 47% of the HDPE of the first polyethylene polymer and from about 28 to about 34% by weight of HDPE of the second polyethylene polymer.

In certain embodiments, the relative amounts of HDPE are subject to the proviso that the total amount of HDPE in the recycled polymer is from about 50% to about 90% by weight of the recycled polymer.

The recycled polymer may comprise polymers other than at least two polyethylene polymers. The recycled polymer may comprise polyethylene polymers which are not coupled.

In certain embodiments, the recycled polymer comprises up to about 20% of polymers other than HDPE such as, for example, LDPE, LLDPE and polypropylene, any or all of which may be recycled from polymer waste, e.g., post-consumer polymer waste. In certain embodiments, the recycled polymer comprises up to about 20% by weight polypropylene, based on the total weight of the recycled polymer, for example, from about 1% to about 20% by weight, or from about 5% to about 18% by weight, or from about 10% to about 15% by weight, or from about 12 to about 14% by weight.

In certain embodiments, the at least one wall of the pipe may comprise virgin polymer, for example, up to about 75% by weight virgin polymer, or up to about 50% by weight virgin polymer, or up to about 25% by weight virgin polymer, or up to about 15% by weight virgin polymer, or up to about 10% by weight virgin polymer, or up to about 5% by weight virgin polymer, or up to about 1% by weight virgin polymer. In certain embodiments, the at least one wall does not contain virgin polymer. In certain embodiments, the pipe does not contain virgin polymer.

In certain embodiments, the recycled polymer has a density of greater than about 0.90 g/cm$^3$ to equal to or less than about 1.15 g/cm$^3$, for example, greater than about 1.00 g/cm$^3$ to equal to or less than about 1.10 g/cm$^3$, for example, a density of greater than about 1.00 g/cm$^3$ to equal to or less than about 1.05 g/cm$^3$, or a density of from about 1.00 to about 1.04 g/cm$^3$, or from about 1.00 to about 1.03 g/cm$^3$, or from about 1.00 to about 1.02 g/cm$^3$, or a density of about 1.01 g/cm$^3$. In certain embodiments, the recycled polymer has a density of greater than about 1.00 to equal to or less than about 1.05 g/cm$^3$. Density may be determined in accordance with ISO1183.

The functional filler may be present in the recycled polymer in an amount ranging from about 1% up to about 70% by weight, based on the total weight of the recycled polymer. For example, from about 2% to about 60% by weight, or from about 3% to about 50% by weight, or from about 4% to about 40% by weight, or from about 5% to about 30% by weight, or from about 6% to about 25% by weight, or from about 7% to about 20% by weight, or from about 8% to about 15% by weight, or from about 8% to about 12% by weight, based on the total weight of the recycled polymer. The functional filler may be present in amount less than or equal to about 80% by weight of the recycled polymer, for example, less than or equal to about 70% by weight, or less than or equal to about 60% by weight, or less than or equal to about 50% by weight, or less than or equal to about 40% by weight, or less than or equal to about 30% by weight, or less than or equal to about 20% by weight, or less than or equal to about 50% by weight, based on the total weight of the recycled polymer.

The surface treatment agent (i.e., coupling modifier) of the functional filler, preferably the compound of formula (1) as described below, may be present in the recycled polymer in an amount of from about 0.01% by weight to about 4% by weight, based on the total weight of the recycled polymer, for example, from about 0.02% by weight to about 3.5% by weight, or from about 0.05% by weight to about 1.4% by weight, or from about 0.1% by weight to about 0.7% by weight, or from about 0.15% by weight to about 0.7% by weight, or from about 0.3% by weight to about 0.7% by weight, or from about 0.5% by weight to about 0.7% by weight, or from about 0.02% by weight to about 0.5%, or from about 0.05% by weight to about 0.5% by weight, or from about 0.1% by weight to about 0.5% by weight, or from about 0.15% by weight to about 0.5% by weight, or from about 0.2% by weight to about 0.5% by weight, or from about 0.3% by weight to about 0.5% by weight, based on the total weight of the recycled polymer.

As such, recycled polymer which is advantageously coupled in accordance with certain embodiment described herein may be used to at least partially replace, or even wholly replace, virgin polymer, such as virgin polypropylene, in a pipe having a nominal inside diameter of at least about 400 mm and obtain a pipe having a SN of at least about 4, or at least about 6, or at least about 8 (with the concomitant cost and environmental benefits). Similarly, recycled which is advantageously coupled in accordance with certain embodiments described herein may be used to at least partially replace, or even wholly replace, recycled polymer which is not coupled, for example, uncoupled recycled HDPE derived from post-consumer polymer waste, e.g., blow moulded bottles, in a pipe having a nominal inside diameter of at least about 400 mm and obtain a pipe having a SN of at least about 4, or at least about 6, or at least about 8 (again, with the concomitant cost and environmental benefits). Moreover, the coupling effect means that less polymer (recycled or virgin) can be used (i.e., by replacing a portion with the functional filler) without adversely effecting mechanical properties and, in some embodiments, improving mechanical properties (with the concomitant cost benefits).

The Functional Filler

In certain embodiments, the functional filler comprises an inorganic particulate and a surface treatment agent comprising a first compound including a terminating propanoic group or ethylenic group with one or two adjacent carbonyl groups. The surface treatment agent may be coated on the surface of the inorganic particulate. The purpose of the surface treatment agent (e.g., coating) is to improve the compatibility of the inorganic particulate filler and the polymer matrix with which it is to be combined, and/or improve the compatibility of two or more different polymers in the recycled polymer and, thus, the at least one wall of the pipe, by cross-linking or grafting the different polymers. In recycled polymer compositions comprising recycled and virgin polymer, the functional filler coating may serve to cross-link or graft the different polymers.

In other aspects and embodiments of the present invention, the coating additionally or alternatively comprises a compound selected from the group consisting of one or more fatty acids and one or more salts of fatty acids, for example, stearic acid or calcium stearate.

The Inorganic Particulate Material

The inorganic particulate material may, for example, be an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, talc, mica, perlite or diatomaceous earth, or magnesium hydroxide, or aluminium trihydrate, or combinations thereof.

A preferred inorganic particulate material for use in the method according to the first aspect of the present invention is calcium carbonate. Hereafter, the invention may tend to be discussed in terms of calcium carbonate, and in relation to aspects where the calcium carbonate is processed and/or treated. The invention should not be construed as being limited to such embodiments.

The particulate calcium carbonate used in the present invention may be obtained from a natural source by grinding. Ground calcium carbonate (GCC) is typically obtained by crushing and then grinding a mineral source such as chalk, marble or limestone, which may be followed by a particle size classification step, in order to obtain a product having the desired degree of fineness. Other techniques such as bleaching, flotation and magnetic separation may also be used to obtain a product having the desired degree of fineness and/or colour. The particulate solid material may be ground autogenously, i.e. by attrition between the particles of the solid material themselves, or, alternatively, in the presence of a particulate grinding medium comprising particles of a different material from the calcium carbonate to be ground. These processes may be carried out with or without the presence of a dispersant and biocides, which may be added at any stage of the process.

Precipitated calcium carbonate (PCC) may be used as the source of particulate calcium carbonate in the present invention, and may be produced by any of the known methods available in the art. TAPPI Monograph Series No 30, "Paper Coating Pigments", pages 34-35 describes the three main commercial processes for preparing precipitated calcium carbonate which is suitable for use in preparing products for use in the paper industry, but may also be used in the practice of the present invention. In all three processes, a calcium carbonate feed material, such as limestone, is first calcined to produce quicklime, and the quicklime is then slaked in water to yield calcium hydroxide or milk of lime. In the first process, the milk of lime is directly carbonated with carbon dioxide gas. This process has the advantage that no by-product is formed, and it is relatively easy to control the properties and purity of the calcium carbonate product. In the second process the milk of lime is contacted with soda ash to produce, by double decomposition, a precipitate of calcium carbonate and a solution of sodium hydroxide. The sodium hydroxide may be substantially completely separated from the calcium carbonate if this process is used commercially. In the third main commercial process the milk of lime is first contacted with ammonium chloride to give a calcium chloride solution and ammonia gas. The calcium chloride solution is then contacted with soda ash to produce by double decomposition precipitated calcium carbonate and a solution of sodium chloride. The crystals can be produced in a variety of different shapes and sizes, depending on the specific reaction process that is used. The three main forms of PCC crystals are aragonite, rhombohedral and scalenohedral, all of which are suitable for use in the present invention, including mixtures thereof.

Wet grinding of calcium carbonate involves the formation of an aqueous suspension of the calcium carbonate which may then be ground, optionally in the presence of a suitable dispersing agent. Reference may be made to, for example, EP-A-614948 (the contents of which are incorporated by reference in their entirety) for more information regarding the wet grinding of calcium carbonate. The inorganic particulate, e.g., calcium carbonate, may also be prepared by any suitable dry grinding technique.

In some circumstances, additions of other minerals may be included, for example, one or more of kaolin, calcined kaolin, wollastonite, bauxite, talc, titanium dioxide or mica, could also be present.

When the inorganic particulate material is obtained from naturally occurring sources, it may be that some mineral impurities will contaminate the ground material. For example, naturally occurring calcium carbonate can be present in association with other minerals. Thus, in some embodiments, the inorganic particulate material includes an amount of impurities. In general, however, the inorganic particulate material used in the invention will contain less than about 5% by weight, preferably less than about 1% by weight, of other mineral impurities.

Unless otherwise stated, particle size properties referred to herein for the inorganic particulate materials are as measured by the well known conventional method employed in the art of laser light scattering, using a CILAS 1064 instrument (or by other methods which give essentially the same result). In the laser light scattering technique, the size of particles in powders, suspensions and emulsions may be measured using the diffraction of a laser beam, based on an application of Mie theory. Such a machine provides measurements and a plot of the cumulative percentage by volume of particles having a size, referred to in the art as the 'equivalent spherical diameter' (e.s.d), less than given e.s.d values. The mean particle size d50 is the value determined in this way of the particle e.s.d at which there are 50% by volume of the particles which have an equivalent spherical diameter less than that d50 value. The term d90 is the particle size value less than which there are 90% by volume of the particles.

The d50 of the inorganic particulate may be less than about 100 µm, for example, less than about 80 µm for example, less than about 60 µm for example, less than about 40 µm, for example, less than about 20 µm, for example, less than about 15 µm, for example, less than about 10 µm, for example, less than about 8 µm, for example, less than about 6 µm, for example, less than about 5 µm, for example, less than about 4, for example, less than about 3 µm, for example less than about 2 µm, for example, less than about 1.5 µm or, for example, less than about 1 µm. The d50 of the inorganic particulate may be greater than about 0.5 µm, for example, greater than about 0.75 µm greater than about 1 µm, for example, greater than about 1.25 µm or, for example, greater than about 1.5 µm. The d50 of the inorganic particulate may be in the range of from 0.5 to 20 µm, for example, from about 0.5 to 10 µm, for example, from about 1 to about 5 µm, for example, from about 1 to about 3 µm, for example, from about 1 to about 2 µm, for example, from about 0.5 to about 2 µm or, for example, from about 0.5 to 1.5 µm, for example, from about 0.5 to about 1.4 µm, for example, from about 0.5 to about 1.4 µm, for example, from about 0.5 to about 1.3 µm, for example, from about 0.5 to about 1.2 µm, for example, from about 0.5 to about 1.1 µm, for example, from about 0.5 to about 1.0 µm, for example, from about 0.6 to about 1.0 µm, for example, from about 0.7 to about 1.0 µm, for example about 0.6 to about 0.9 µm, for example, from about 0.7 to about 0.9 µm.

The d90 (also referred to as the top cut) of the inorganic particulate may be less than about 150 µm, for example, less than about 125 µm for example, less than about 100 µm for example, less than about 75 µm, for example, less than about 50 µm, for example, less than about 25 µm, for example, less than about 20 µm, for example, less than about 15 µm, for example, less than about 10 µm, for example, less than about 8 µm, for example, less than about 6 µm, for example, less than about 4 µm, for example, less than about 3 µm or, for example, less than about 2 µm. Advantageously, the d90 may be less than about 25 µm.

The amount of particles smaller than 0.1 µm is typically no more than about 5% by volume.

The inorganic particulate may have a particle steepness equal to or greater than about 10. Particle steepness (i.e., the steepness of the particle size distribution of the inorganic particulate) is determined by the following formula:

Steepness=100×($d_{30}/d_{70}$), wherein d30 is the value of the particle e.s.d at which there are 30% by volume of the particles which have an e.s.d less than that d30 value and d70 is the value of the particle e.s.d. at which there are 70% by volume of the particles which have an e.s.d. less than that d70 value.

The inorganic particulate may have a particle steepness equal to or less than about 100. The inorganic particulate may have a particle steepness equal to or less than about 75, or equal to or less than about 50, or equal to or less than about 40, or equal to or less than about 30. The inorganic particulate may have a particle steepness from about 10 to about 50, or from about 10 to about 40.

The inorganic particulate is treated with a surface treatment agent, i.e., a coupling modifier, such that the inorganic particulate has a surface treatment on its surface. In certain embodiments, the inorganic particulate is coated with the surface treatment agent.

The at least one wall of the pipe may contain one or more secondary filler components, if desired. The secondary filler component may not be treated with a surface treatment agent. Such additional components, where present, are suitably selected from known filler components for polymer compositions. For example, the inorganic particulate used in the functional filler may be used in conjunction with one more other known secondary filler components, such as for example, titanium dioxide, carbon black and talc. In certain embodiments, the polymer composition comprises talc as a secondary filler component. In certain embodiments, the weight ration of inorganic particulate to secondary filler component is from about 1:1 to about 10:1, for example, from about 1:1 to about 5:1, or from about 2:1 to about 4:1. In certain embodiments, the inorganic particulate of the functional filler is calcium carbonate, for example, ground calcium carbonate, and the secondary filler component is uncoated talc. When a secondary filler component is used, it may be present in an amount of from about 0.1% to about 50% by weight of the polymer composition, for example, from about 1% to about 40% by weight, or from about 2% to about 30% by weight, or from about 2% to about 25% by weight, or from about 2% to about 20% by weight, or from about 3% to about 15% by weight, or from about 4% to about 10% by weight of the recycled polymer.

The Surface Treatment Agent

The surface treatment agent comprises a compound including a terminating propanoic group or ethylenic group with one or two adjacent carbonyl groups (also referred to herein as a coupling modifier). A function of the surface treatment agent is to couple polymeric species present in the polymer composition, e.g., to couple at least the at least two polyethylene polymers. Without wishing to be bound by theory, it is believed that coupling involves a physical (e.g., steric) and/or chemical (e.g., chemical bonding, such as covalent or van der Waals) interaction between the polymers and the surface treatment agent.

In one embodiment, the surface treatment agent (i.e., coupling modifier) has a formula (1):

$$A\text{-}(X\text{—}Y\text{—}CO)_m(O\text{—}B\text{—}CO)_nOH \quad (1)$$

wherein
A is a moiety containing a terminating ethylenic bond with one or two adjacent carbonyl groups;
X is O and m is 1 to 4 or X is N and m is 1;
Y is $C_{1-18}$-alkylene or $C_{2-18}$-alkenylene;
B is Cm-alkylene; n is 0 to 5;
provided that when A contains two carbonyl groups adjacent to the ethylenic group, X is N.

In an embodiment, A-X— is the residue of acrylic acid, optionally wherein $(O\text{—}B\text{—}CO)_n$ is the residue of δ-valerolactone or ε-caprolactone or a mixture thereof, and optionally wherein n is zero.

In another embodiment, A-X— is the residue of maleimide, optionally wherein $(O\text{—}B\text{—}CO)_n$ is the residue of δ-valerolactone or ε-caprolactone or a mixture thereof, and optionally wherein n is zero.

Specific examples of coupling modifiers are β-carboxy ethylacrylate, β-carboxyhexylmaleimide, 10-carboxydecylmaleimide and 5-carboxy pentyl maleimide. Exemplary coupling modifiers and their methods of preparation are described in U.S. Pat. No. 7,732,514, the entire contents of which is hereby incorporated by reference.

In another embodiment, the coupling modifier is β-acryloyloxypropanoic acid or an oligomeric acrylic acid of the formula (2):

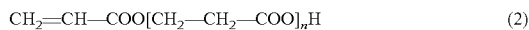   (2)

wherein n represents a number from 1 to 6.

In an embodiment, n is 1, or 2, or 3, or 4, or 5, or 6.

The oligomeric acrylic acid of formula (2) may be prepared by heating acrylic acid in the presence of 0.001 to 1% by weight of a polymerization inhibitor, optionally under elevated pressure and in the presence of an inert solvent, to a temperature in the range from about 50° C. to 200° C. Exemplary coupling modifiers and their methods of preparation are described in U.S. Pat. No. 4,267,365, the entire contents of which is hereby incorporated by reference.

In another embodiment, the coupling modifier is β-acryloyloxypropanoic acid. This species and its method of manufacture is described in U.S. Pat. No. 3,888,912, the entire contents of which is hereby incorporated by reference.

The surface treatment agent is present in the functional filler in an amount effective to achieve the desired result. This will vary between coupling modifiers and may depend upon the precise composition of the inorganic particulate. For example, the coupling modifier may be present in an amount equal to or less than about 5 wt. % based on the total weight of the functional filler, for example equal to or less than about 2 wt. % or, for example equal to or less than about 1.5 wt. %. In an embodiment, the coupling modifier is present in the functional filler in an amount equal to or less than about 1.2 wt. % based on the total weight of the functional filler, for example equal to or less than about 1.1 wt. %, for example equal to or less than about 1.0 wt. %, for example, equal to or less than about 0.9 wt. %, for example equal to or less than about 0.8 wt. %, for example equal to or less than about 0.7 wt. %, for example, less than or equal to about 0.6 wt. %, for example equal to or less than about 0.5 wt %, for example equal to or less than about 0.4 wt. %, for example equal to or less than about 0.3 wt. %, for example equal to or less than about 0.2 wt. % or, for example less than about 0.1 wt. %. Typically, the coupling modifier is present in the functional filler in an amount greater than about 0.05 wt. %. In further embodiments, the coupling modifier is present in the functional filler in an amount ranging from about 0.1 to 2 wt. % or, for example, from about 0.2 to about 1.8 wt. %, or from about 0.3 to about 1.6 wt. %, or from about 0.4 to about 1.4 wt. %, or from about 0.5 to about 1.3 wt. %, or from about 0.6 to about 1.2 wt. %, or from about 0.7 to about 1.2 wt. %, or from about 0.8 to about 1.2 wt. %, or from about 0.8 to about 1.1 wt. %.

In certain embodiments, a compound/compounds including a terminating propanoic group or ethylenic group with one or two adjacent carbonyl groups is/are the sole species present in the surface treatment agent.

In certain embodiments, the surface treatment agent additionally comprises a second compound selected from the group consisting of one or more fatty acids and one or more salts of fatty acids, and combinations thereof.

In one embodiment, the one or more fatty acids is selected from the group consisting of lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic, erucic acid, docosahexaenoic acid and combinations thereof. In another embodiment, the one or more fatty acids is a saturated fatty acid or an unsaturated fatty acid. In another embodiment, the fatty acid is a $C_{12}$-$C_{24}$ fatty acid, for example, a $C_{16}$-$C_{22}$ fatty acid, which may be saturated or unsaturated. In one embodiment, the one or more fatty acids is stearic acid, optionally in combination with other fatty acids.

In another embodiment, the one or more salts of a fatty acid is a metal salt of the aforementioned fatty acids. The metal may be an alkali metal or an alkaline earth metal or zinc. In one embodiment, the second compound is calcium stearate.

The second compound, when present, is present in the functional filler in an amount effective to achieve the desired result. This will vary between coupling modifiers and may depend upon the precise composition of the inorganic particulate. For example, the second compound may be present in an amount equal to or less than about 5 wt. % based on the total weight of the functional filler, for example equal to or less than about 2 wt. % or, for example equal to or less than about 1 wt. %. In an embodiment, the, second compound is present in the functional filler in an amount equal to or less than about 0.9 wt. % based on the total weight of the functional filler, for example equal to or less than about 0.8 wt. %, for example equal to or less than about 0.7 wt. %, for example, less than or equal to about 0.6 wt. %, for example equal to or less than about 0.5 wt %, for example equal to or less than about 0.4 wt. %, for example equal to or less than about 0.3 wt. %, for example equal to or less than about 0.2 wt. % or, for example equal to or less than about 0.1 wt. %. Typically, the second compound, if present, is present in the functional filler in an amount greater than about 0.05 wt. %. The weight ratio of the coupling modifier to the second compound may be from about 5:1 to about 1:5, for example, from about 4:1 to about 1:4, for example, from about 3:1 to about 1:3, for example, from about 2:1 to about 1:2 or, for example, about 1:1. The amount of coating, comprising the first compound (i.e., the coupling modifier) and the second compound (i.e., the one more fatty acids or salts thereof), may be an amount which is calculated to provide a monolayer coverage on the surface of the inorganic particulate. In embodiments, the weight ratio of the first compound to the second compound is from about 4:1 to about 1:3, for example from about 4:1 to about 1:2, for example from about 4:1 to about 1:1, for example from about 4:1 to about 2:1, for example, from about 3.5:1 to about 1:1, for example from about 3.5:1 to 2:1 or, for example, from about 3.5:1 to about 2.5:1

In certain embodiments, the surface treatment agent does not comprise a compound selected from the group consisting of one or more fatty acids and one or more salts of a fatty acid.

The recycled polymer may additionally comprise a peroxide-containing additive. In an embodiment, the peroxide-containing additive comprises di-cumyl peroxide or 1,1-Di(tert-butylperoxy)-3,3,5-trimethylcyclohexane. The peroxide-containing additive may not necessarily be included with the surface treatment agent and instead may be added during the compounding of the functional filler and the recycled polymers, as described below. In some polymer systems, e.g., those containing HDPE, the inclusion of a peroxide-containing additive may promote cross-linking of the polymer chains. In other polymer systems, e.g., polypropylene, the inclusion of a peroxide-containing additive may promote polymer chain scission. The peroxide-containing additive may be present in amount effective to achieve the desired result. This will vary between coupling modifiers and may depend upon the precise composition of the inorganic particulate and the polymer. For example, the peroxide-containing additive may be present in an amount equal to or less than about 1 wt. % based on the weight of the recycled polymer to which the peroxide-containing additive is to be added, for example, equal to or less than about 0.5 wt. %, for example, 0.1 wt %, for example equal to or less than about 0.09 wt. %, or for example equal to or less than about 0.08 wt. % or for example, equal to or less than about 0.06 wt. %. Typically, the peroxide-containing additive, if present, is present in an amount greater than about 0.01 wt. % based on the weight of the recycled polymer.

The functional filler may be prepared by combining the inorganic particulate, surface treatment agent and optional peroxide-containing additive and mixing using conventional methods, for example, using a Steele and Cowlishaw high intensity mixer, preferably at a temperature equal to or less than 80° C. The compound(s) of the surface treatment agent may be applied after grinding the inorganic particulate, but before the inorganic particulate is added to the optionally recycled polymer composition. For example, the surface treatment agent may be added to the inorganic particulate in a step in which the inorganic particulate is mechanically de-aggregated. The surface treatment agent may be applied during de-aggregation carried out in a milling machine.

Optional Additional Filler Components

The functional filler may additionally comprise an antioxidant. Suitable antioxidants include, but are not limited to, organic molecules consisting of hindered phenol and amine derivatives, organic molecules consisting of phosphates and lower molecular weight hindered phenols, and thioesters. Exemplary antioxidants include Irganox 1010 and Irganox 215, and blends of Irganox 1010 and Irganox 215. The amount of antioxidant may range from about 0.01% by weight to about 5% by weight, based on recycled polymer content, for example, from about 0.05% by weight to about 2.5% by weight, or from about 0.05% by weight to about 1.5% by weight, or from about 0.05% by weight to about 1.0% by weight, or from about 0.05% by weight to about 0.5% by weight, or from about 0.05% by weight to about 0.25% by weight, or from about 0.05% by weight to about 0.15% by weight based on recycled polymer content.

Method of Making Pipe

In certain embodiments, the at least one wall is formed, for example, extruded, from polymer resin composition comprising suitable amounts of recycled polymer and optional functional filler and impact modifier.

Compounding per se is a technique which is well known to persons skilled in the art of polymer processing and manufacture. It is understood in the art that compounding is distinct from blending or mixing processes conducted at temperatures below that at which the constituents become molten.

Such methods include compounding and extrusion. Compounding may be carried out using a twin screw compounder, for example, a Baker Perkins 25 mm twin screw compounder. The polymers, functional filler, optional impact modifier and optional peroxide containing additive and/or optional antioxidant may be premixed and fed from a single hopper. The resulting melt may be cooled, for example, in a water bath, and then pelletized.

The compounded compositions may further comprise additional components, such as slip aids (for example Erucamide), process aids (for example Polybatch® AMF-705), mould release agents and antioxidants. Suitable mould release agents will be readily apparent to one of ordinary skill in the art, and include fatty acids, and zinc, calcium, magnesium and lithium salts of fatty acids and organic phosphate esters. Specific examples are stearic acid, zinc stearate, calcium stearate, magnesium stearate, lithium stearate, calcium oleate and zinc palmitate. Slip and process aids, and mould release agents may be added in an amount less than about 5 wt. % based on the weight of the masterbatch. Pipes may then be extruded, compression moulded or injected moulded using conventional techniques known in the art, as will be readily apparent to one of ordinary skill in the art.

In certain embodiments, the at least two polyethylene polymers are each contained in separate polymer streams, and are fed to the compounder separately. For example, the first polyethylene comprising HDPE is fed to the compounder as a first polymer stream, the second polyethylene polymer is fed to the compound as a second polymer stream, the functional filler is fed to the compounder as a third stream, and optional impact modifier is fed to the compounder as a fourth stream. In such embodiments, the second polymer stream comprising the second polyethylene polymer may be part of a polymer stream comprising other polymer components, for example, polypropylene, LDPE and/or LLDPE. In other embodiments, any other polymer components may be fed to the compounder via separate feed streams.

In certain embodiments, the at least two polyethylene polymers are part of the same polymer stream. Thus, in such embodiments, a single feed stream comprising at least the two polyethylene polymers, and optionally including other polymer components, such as polypropylene, LDPE and/or LLDPE, is fed to the compounder.

In certain embodiments, the functional filler is not contacted with a polymer prior to compounding with the at least two polyethylene polymers.

The relative amounts of each component will be such as to prepare recycled polymer and, thus, a pipe, according to the present invention.

EXAMPLES

Example 1—Preparation of Test Pieces

Three polymer compositions were prepare as follows:
Comparative Composition A

Ground calcium carbonate ($d_{50}$=0.8 um) coated with a coupling modifier according to formula (1) and a recycled mixed polyolefin feed comprising HDPE and PP were prepared using a Baker Perkins 25 mm twin screw compounder. The recycled mixed polyolefin feed was derived from injection moulded materials.

The mixed polyolefin feed had a MFR of 1.5 @ 190° C./2.16 kg.

The amount of surface treatment applied to the calcium carbonate was calculated to give monolayer coverage on the surface.

The resulting polymer composition comprised 20% by weight surface treated calcium carbonate, 56% HDPE and 24% polypropylene.

Comparative Composition B

Pre-formed composition A (50% by weight) was compounded with a different polyethylene polymer (50% by weight) derived from recycled blow-moulded bottles, in accordance with the procedure described for comparative composition A.

The second polyethylene polymer had a MFR of 0.4 @ 190° C./2.16 kgs.

The resulting polymer composition comprised 10% by weight surface treated calcium carbonate, 31.5% by weight HDPE from the mixed polyolefin feed, 45% HDPE from the polyethylene derived from the blow-moulded bottles and 13.5% polypropylene. Both polyethylene polymers are not coupled.

Composition 1 (of the Invention)

The same surface treated calcium carbonate and mixed polyolefin feed used to prepared comparative composition A, and the polyethylene polymer derived from derived recycled from blow-moulded bottles, were fed to and compounded in the compounder as described above. The relative amounts of each component were selected such that the final resulting polymer composition comprised 10% by weight surface treated calcium carbonate, 31.5% by weight HDPE from the mixed polyolefin feed, 13.5% by weight polypropylene, and 45% by weight HDPE from the polyethylene derived from the blow moulded bottles. Both polyethylene polymers are coupled.

Example 2—Mechanical Testing

Test pieces of compositions A, B and 1 were prepared.

After conditioning the test pieces at 23° C., the samples were tested as follows:

The resilience @ −20° C. (toughness) of each test piece was tested in accordance with ISO179.

The stiffness (flexural modulus) of each test piece was tested in accordance with ISO178.

The elongation at break of each test piece was tested in accordance with ISO527

Figure 2:
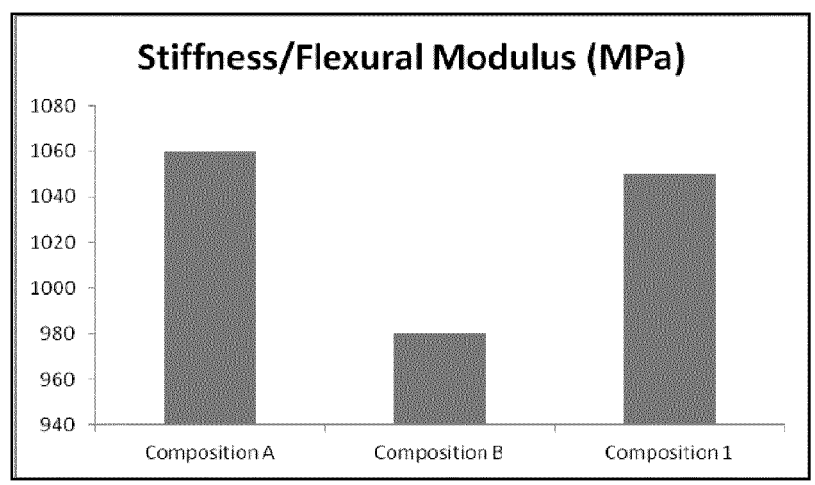
FIG. 2 is a graph summarizing the stiffness/flexural modulus of test pieces prepared according to the Examples.
Figure 3:
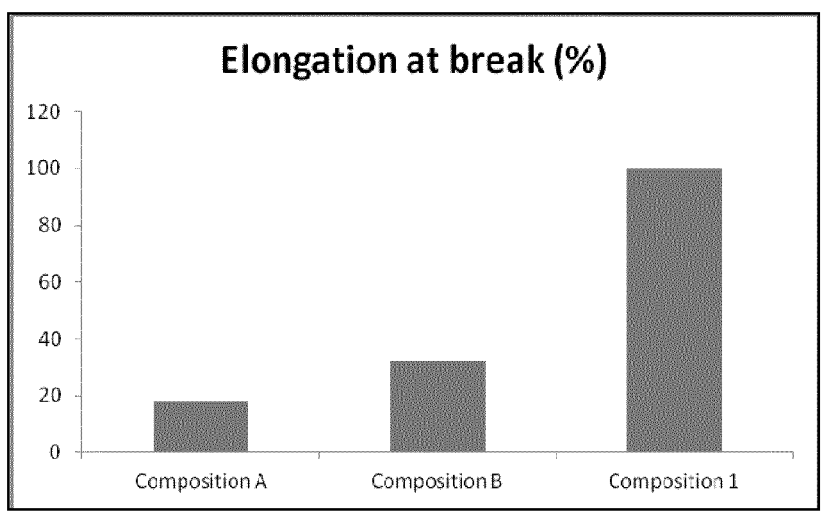
FIG. 3 is a graph summarizing the elongation at break of test pieces prepared according to the Examples.

Results are summarised in FIGS. 1-3.

Example 3

Preparation of Compounded Recycled Polymer Resin A

Ground calcium carbonate (d50=0.8 um) coated with a coupling modifier according to formula (1) and a recycled mixed polyolefin feed comprising HDPE and PP (having a MFR of 1.5 @ 190° C./2.16 kg), were prepared using a Baker Perkins 25 mm twin screw compounder.

The amount of surface treatment applied to the calcium carbonate was calculated to give monolayer coverage on the surface.

Preparation of Compounded Recycled Polymer Resin B

The same surface treated calcium carbonate and mixed polyolefin feed used to prepare resin A, and a polyethylene polymer derived from derived recycled bottles (having a MFR of 0.4 @ 190° C./2.16 kgs), were fed to and were prepared using the same Baker Perkins 25 mm twin screw compounder. Both polyethylene polymers are coupled.

Example 4

Preparation of Test Pieces

Recycled polymer blends, based on weight percentages, are described in Table 1. All blends were prepared via melt mixing with a Coperion ZSK18 twin-screw extruder, in presence of 0.1 wt. % antioxidant (base on polymer content). The impact modifier, when present, was an ethylene-octene copolymer having a MFR of about 1 @ 190° C./2.16 kgs. The barrel temperature was maintained at 200, 205, 210, 215, 220, 230 and 240° C. from hopper to die. The screw speed was set to 600 rpm, and the feed rate at 6.0 kg/hour. The hot extrudates were immediately quenched in water and pelletized. Test specimens from mechanical testing were then produced.

Mechanical Testing of Test Pieces

The impact strength (unnotched Charpy impact strength @ −20° C.) of each test piece was tested in accordance with ISO179 using an Instron Ceast 9340 falling weight impact tester. The results correspond to an average of complete break measurements for each test piece.

The elongation at break of each test piece was tested in accordance with ISO527 using a Tinius Olsen Benchtop tensile tester, and the results correspond to an average of eight measurements for each test piece.

Results are summarised in Table 1 below.

TABLE 1

| | | Resin only | +2.5 wt. % impact modifier | +5.0 wt. % impact modifier | +7.5 wt. % impact modifier | +10.0 wt. % impact modifier |
|---|---|---|---|---|---|---|
| RESIN B | MFR (g/10 min (2.16 kg @ 190° C.)) | 0.191 | 0.182 | 0.188 | 0.199 | |
| | Impact strength (kJ/m$^2$) | 123.52[a] | DNF[b] | DNF[b] | DNF[b] | — |
| | Elongation at Break (%) | 63.76 | 115.62 | 140.60 | 159.23 | |
| RESIN A | MFR (g/10 min (2.16 kg @ 190° C.)) | 0.447 | 0.456 | 0.423 | | 0.488 |
| | Impact strength (kJ/m$_2$) | 71.153[c] | 113.06[d] | 132.44[e] | | DNF[b] |
| | Elongation at Break (%) | 13.76 | 23.20 | 40.33 | | 159.83 |

[a] 66.6% Complete Break;
[b] Did Not Fail (100% Bend);
[c] 100% Complete Break;
[d] 100% Complete Break;
[e] 66.66% Complete Break

The invention claimed is:

1. A pipe having at least one wall, the pipe having a nominal inside diameter of at least about 400 mm and a SN of at least about 4, wherein
   the at least one wall comprises a functional filler and a recycled polymer;
   the at least one wall comprises at least about 25% by weight of the recycled polymer, based on the total weight of the at least one wall;
   the functional filler comprises an inorganic particulate and a surface treatment agent on a surface of the inorganic particulate;
   the recycled polymer comprises or is a mixture of different polymer types; and
   the recycled polymer is coupled to the inorganic particulate material via the surface treatment agent;
   further wherein the recycled polymer comprises at least two coupled polyethylene polymers, each of which comprises HDPE;
   further wherein the HDPE of the first of the at least two polyethylene polymers is different from the HDPE of the second of the at least two polyethylene polymers; and
   further wherein the weight ratio of the HDPE of the first polyethylene polymer to the HDPE of the second polyethylene polymer is from about 0.5:1 to about 3:1.

2. A pipe according to claim 1, wherein the nominal inside diameter is at least about 500 mm.

3. A pipe according to claim 1, wherein the pipe has a SN of at least about 6.

4. A pipe according to claim 1, wherein the pipe meets the requirements of standard BS EN 13476-3:2007+A1:2009 in so far as the standard relates to pipes for non-pressure underground drainage and sewerage.

5. A pipe according to claim 1, wherein the pipe is a single-walled pipe or a twin-walled pipe.

6. A pipe according to claim 1, wherein the pipe is a corrugated pipe.

7. A pipe according to claim 1, wherein the pipe is a twin-walled pipe or a corrugated twin-walled pipe, and wherein the at least one wall is the outer wall of the pipe.

8. A pipe according to claim 1, wherein the at least one wall comprises at least about 50% by weight of recycled polymer.

9. A pipe according to claim 1, wherein the at least one wall comprise up to about 75% by weight of recycled polymer.

10. A pipe according to claim 1, wherein one of the at least two polyethylene polymers has an MFR of less than 0.75 g/10 mins (2.16 kg@190° C.), and
    wherein the second of the at least two polyethylene polymers has an MFR equal to or greater than 0.75 g/10 mins (2.16 kg@190° C.).

11. A pipe according to claim 1, further comprising recycled polypropylene.

12. A pipe according to claim 1, wherein the inorganic particulate is an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, talc, mica, perlite or diatomaceous earth, or magnesium hydroxide, or aluminium trihydrate, or combinations thereof.

13. A pipe according to claim 1, wherein the surface treatment agent comprises a first compound including a terminating propanoic group or ethylenic group with one or two adjacent carbonyl groups.

14. A pipe according to claim 1, wherein the functional filler is present in an amount ranging from about 5% by weight to about 25% by weight, based on the total weight of the recycled polymer.

15. A pipe according to claim 1, wherein the HDPE of one of the at least two polyethylene polymers is present in an amount ranging from about 10% to about 75% by weight of the recycled polymer.

16. A pipe according to claim 1, wherein the at least one wall comprises up to about 10% by weight of an impact modifier.

17. A pipe according to claim 16, wherein the impact modifier is a polyolefin elastomer.

18. A pipe according to claim 17, wherein the polyolefin elastomer is a copolymer of ethylene and one or more of octane, butane, styrene, octane, or another olefin.

19. A pipe according to claim 16, wherein the impact modifier is a copolymer of styrene and butadiene.

20. A pipe according to claim 16, wherein the polyolefin elastomer has a density of from about 0.80 to about 0.95 g/cm3 and/or a MFR of 0.2 g/10 min (2.16 kg@190° C.) to about 30 g/10 min (2.16 kg@190° C.).

21. A pipe according to claim 1, wherein the at least one wall is formed from a compounded polymer resin comprising recycled polymer and a functional filler comprising an inorganic particulate and a surface treatment agent on a surface of the functional filler.

22. A pipe according to claim 13, wherein the first compound has a formula (1):

$$A-(X-Y-CO)_m(O-B-CO)_nOH \qquad (1)$$

wherein
   A is a moiety containing a terminating ethylenic bond with one or two adjacent carbonyl groups;
   X is O and m is 1 to 4 or X is N and m is 1;
   Y is $C_{1-18}$-alkylene or $C_{2-18}$-alkenylene;
   B is $C_{2-6}$-alkylene; and
   n is 0 to 5,
provided that when A contains two carbonyl groups adjacent to the ethylenic group, X is N.

* * * * *